United States Patent [19]
Werner et al.

[11] Patent Number: 5,809,074
[45] Date of Patent: Sep. 15, 1998

[54] TECHNIQUE FOR IMPROVING THE BLIND CONVERGENCE OF AN ADAPTIVE EQUALIZER USING A TRANSITION ALGORITHM

[75] Inventors: Jean-Jacques Werner, Holmdel; Jian Yang, Cliffwood, both of N.J.

[73] Assignee: Lucent Technologies Inc., Murray Hill, N.J.

[21] Appl. No.: 744,908

[22] Filed: Nov. 8, 1996

[51] Int. Cl.$^6$ .................................................. H04L 27/01
[52] U.S. Cl. ........................ 375/233; 375/234; 375/235; 375/232; 364/724.2
[58] Field of Search .................................. 375/229, 230, 375/232, 233, 234, 235, 266, 350; 364/724.2

[56] References Cited

U.S. PATENT DOCUMENTS

| | | | |
|---|---|---|---|
| 4,227,152 | 10/1980 | Godard et al. | 375/13 |
| 5,263,033 | 11/1993 | Seshadri | 371/43.4 |
| 5,311,546 | 5/1994 | Paik et al. | 375/232 |
| 5,432,794 | 7/1995 | Yaguchi | 371/5.5 |

OTHER PUBLICATIONS

Picchi, G. and Prati, G., "Blind Equalization and Carrier Recovery Using a 'Stop–and–Go' Decision–Directed Algorithm," IEEE Trans. on Communications, vol. COM–35, No. 9, pp. 877–887, Sep. 1987.

Weerackody, V. and Kassam, S.A., "Dual–Mode Type Algorithms for Blind Equalization," IEEE Trans. on Communications, vol. 42, No. 1, pp. 22–28, Jan. 1994.

Chung K.I. and Lim, C.T. "Hybrid Blind Equalizer for Improvement of Convergence Performance," Jour. of the Korean Inst. of Telematics and Electronics, vol. 33A, No. 12, pp. 1–8, Dec. 1996.

IEEE Transactions Communications, vol. Com–28, No. 11, Nov. 1980, "Self–recovering equalization and carrier tracking in two dimensional data communications systems", by Dominique N. Godard.

K.N. Oh and Y.O.Chin, "New Blind Equalization Techniques Based on Constant Modulus Algorithm", IEEE, May 1995, pp. 865–869.

Y. Sato, "A Method of Self–Recovering Equalization for Multilevel Amplitude–Modulation Systems," IEEE Trans. Commun., pp. 679–682, Jun. 1975.

A. Benveniste and M. Goursat, "Blind Equalizers", IEEE Trans. Commun., vol. 32, No. 8, pp. 871–883, 1984.

N.K. Jablon, "Joint Blind Equalization, Carrier Recovery, and Timing Recovery for High–Order QAM Signal Constellations", IEEE Trans. Signal Processing, vol. 40, No. 6, pp.1383–1897, 1992.

S. Chen, S. McLaughlin, P.M. Grant and B. Mulgrew, "Multi–Stage Blind Clustering Equaliser", IEEE Trans. Commun., vol. 43, No. 2/3/4, pp. 701–705, Feb./Mar./Apr. 1995.

J.K. Tugnait, "Blind Equalization and Estimation of Digital Communication FIR Channels Using Cumulant Matching", IEEE Trans. Commun., vol. 43, No. 2/3/4 pp. 1240–1245, Feb./Mar./Apr. 1995.

J. J. Werner, "Tutorial on Carrierless AM/PM–Part I–Fundamentals and Digital CAP Transmitter", Contribution to ANSI X3T9.5 TP/PMD Working Group, Minneapolis, Jun. 23, 1992.

*Primary Examiner*—Stephen Chin
*Assistant Examiner*—Jeffrey W. Gluck
*Attorney, Agent, or Firm*—Joseph J. Opalach

[57] ABSTRACT

A blind equalization technique uses both the "constant modulus algorithm" (CMA) and the "multimodulus algorithm" (MMA) during blind start-up. This approach provides the basis for a "transition algorithm." One example of a transition algorithm is the CMA-MMA transition algorithm in which an adaptive filter simply switches from CMA to MMA. Other examples are variations of the CMA-MMA transition algorithm and are illustrated by the "Constant Rotation CMA-MMA" transition algorithm and the "Dynamic Rotation CMA-MMA" transition algorithm.

42 Claims, 15 Drawing Sheets

PHASE-SPLITTING FSLE

UNEQUALIZED SIGNAL CONSTELLATION

START OF MMA

MODULI FOR IN-PHASE DIMENSION

MODULI FOR QUADRATURE PHASE DIMENSION

MODULI FOR BOTH DIMENSIONS

AFTER CONVERGENCE WITH MMA

AFTER CONVERGENCE WITH 64-POINT SLICER

| MAIN CHARACTERISTICS OF THEM BLIND EQUALIZATION ALGORITHMS ||||
|---|---|---|---|
| ALGORITHM | RELIABILITY | COMPLEXITY | SPEED OF CONVERGENCE |
| RCA | LOW | LOW | SECOND FASTEST |
| MMA | HIGH | MEDIUM | FASTEST |
| CMA | VERY HIGH | HIGH | SLOWEST |

FIG. 19

| VALUES OF THE CONSTANTS R, $R_1$ AND $R_2$ FOR SYMBOL LEVELS $\pm1$, $\pm3$, $\pm5$, $\pm7$, ... | | | | | | | |
|---|---|---|---|---|---|---|---|
| ALGORITHM | 4-CAP | 16-CAP | 32-CAP | 64-CAP | 128-CAP | 256-CAP | 512-CAP |
| RCA | 1 | 2.50 | 3.64 | 5.25 | 7.45 | 10.625 | 15.00 |
| MMA | 1 | 2.86 | 4.32 | 6.08 | 8.88 | 12.34 | 17.87 |
| CMA | 1.414 | 3.633 | 5.11 | 7.616 | 10.49 | 15.39 | 21.11 |
| MMA $R_1$ | -- | -- | 4.49 | -- | 9.22 | -- | 18.55 |
| MMA $R_2$ | -- | -- | 2.86 | -- | 6.08 | -- | 12.34 |

EQUALIZED WITH CONSTANT ROTATION CMA

EQUALIZED WITH DYNAMIC ROTATION CMA

# TECHNIQUE FOR IMPROVING THE BLIND CONVERGENCE OF AN ADAPTIVE EQUALIZER USING A TRANSITION ALGORITHM

CROSS-REFERENCE TO RELATED APPLICATIONS

Related subject matter is disclosed in the co-pending, commonly assigned, U.S. patent applications of Werner et al., entitled "Blind Equalization," Ser. No. 08/646,404, filed on May 7, 1996; and Werner et al., entitled "Technique for Improving the Blind Convergence of a Two-Filter Adaptive Equalizer," Ser. No. 08/717,582, filed on Sep. 18, 1996.

BACKGROUND OF THE INVENTION

The present invention relates to communications equipment, and, more particularly, to blind equalization in a receiver.

In blind equalization, the adaptive filters of a receiver are converged without the use of a training signal. As known in the art, there are two techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. patent application of Werner et al., entitled "Blind Equalization," Ser. No. 08/646,404, filed on May 7, 1996, presents a new blind equalization technique—the multimodulus algorithm (MMA)—as an alternative to the above-mentioned RCA and CMA approaches.

However, for all blind equalization approaches the most fundamental performance issue is the ability to achieve reliable initial convergence—else the adaptive filter may converge to a wrong solution such as the well-known "diagonal solution."

Generally speaking, the RCA algorithm has less reliable convergence than either the CMA or MMA algorithms. As between the CMA and MMA algorithms, these algorithms have both benefits and drawbacks. For example, the CMA algorithm provides more reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

SUMMARY OF THE INVENTION

We have realized a blind equalization technique that uses both the CMA and MMA algorithms to achieve complementary results. This approach provides the basis for a "transition algorithm" that yields more reliable blind convergence without creating diagonal solutions, and avoids the expense of a rotator.

In an embodiment of the invention, one example of a transition algorithm is referred to herein as the CMA-MMA transition algorithm. In this approach, an adaptive filter simply switches from CMA to MMA.

In other embodiments of the invention, modified CMA-MMA transition algorithms are presented which provide for improved constellation rotation in comparison to the basic CMA-MMA approach. Illustrative examples of these modified CMA-MMA approaches are the "Constant Rotation CMA-MMA" transition algorithm and the "Dynamic Rotation CMA-MMA" transition algorithm.

BRIEF DESCRIPTION OF THE DRAWING

FIG. 19 shows a table of illustrative data values for use in the RCA, CMA, and MMA, blind equalization methods;

DETAILED DESCRIPTION

Figure 1:
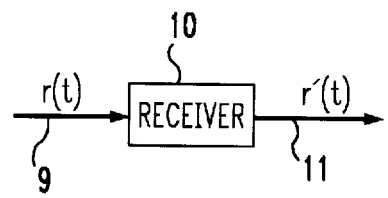
FIG. 1 is an illustrative block diagram of a portion of a communications system embodying the principles of the invention.

An illustrative high-level block diagram of a portion of a communications system embodying the principles of the invention is shown in FIG. 1. For illustrative purposes only, it is assumed that receiver 10 receives a CAP (carrierless, amplitude modulation, phase modulation) signal, which can be represented by:

$$r(t) = \sum_n [a_n p(t - nT) - b_n \tilde{p}(t - nT)] + \xi(t) \tag{1}$$

where $a_n$ and $b_n$ are discrete-valued multilevel symbols, $p(t)$ and $\tilde{p}(t)$ are impulse responses which form a Hilbert pair, T is the symbol period, and $\xi(t)$ is additive noise introduced in the channel.

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise $\xi(t)$ to provide signal r'(t). The inventive concept will illustratively be described in the context of a combined CMA and MMA blind equalization algorithm for use within receiver 10. However, before describing the inventive concept, some background information on adaptive filters and the above-mention RCA, CMA, and MMA algorithms is presented. Also, as used herein, an adaptive filter is, e.g., a fractionally spaced linear equalizer, which is hereafter simply referred to as an FSLE equalizer or, simply, an equalizer.

Equalizer Structures

Figure 2:
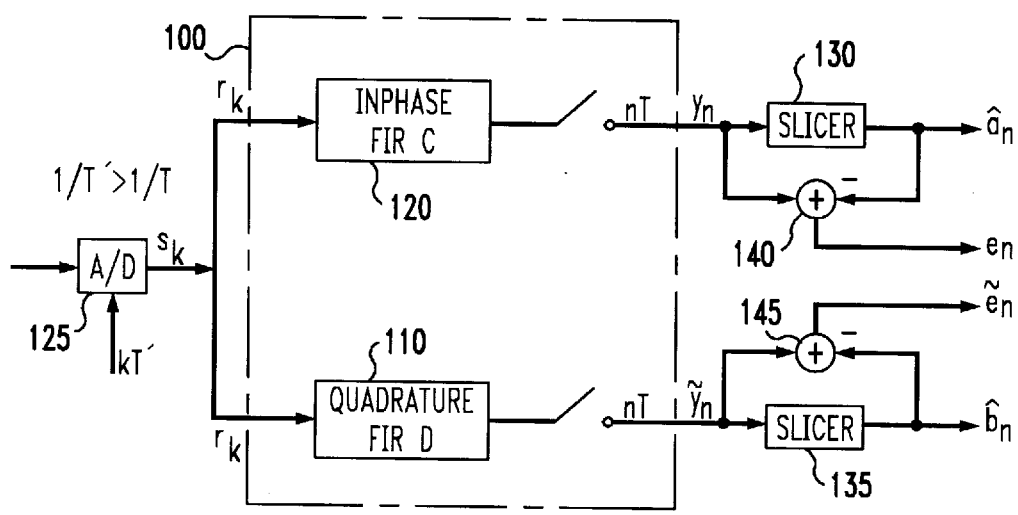
FIG. 2 is an illustrative block diagram of a phase-splitting equalizer.
Figure 3:
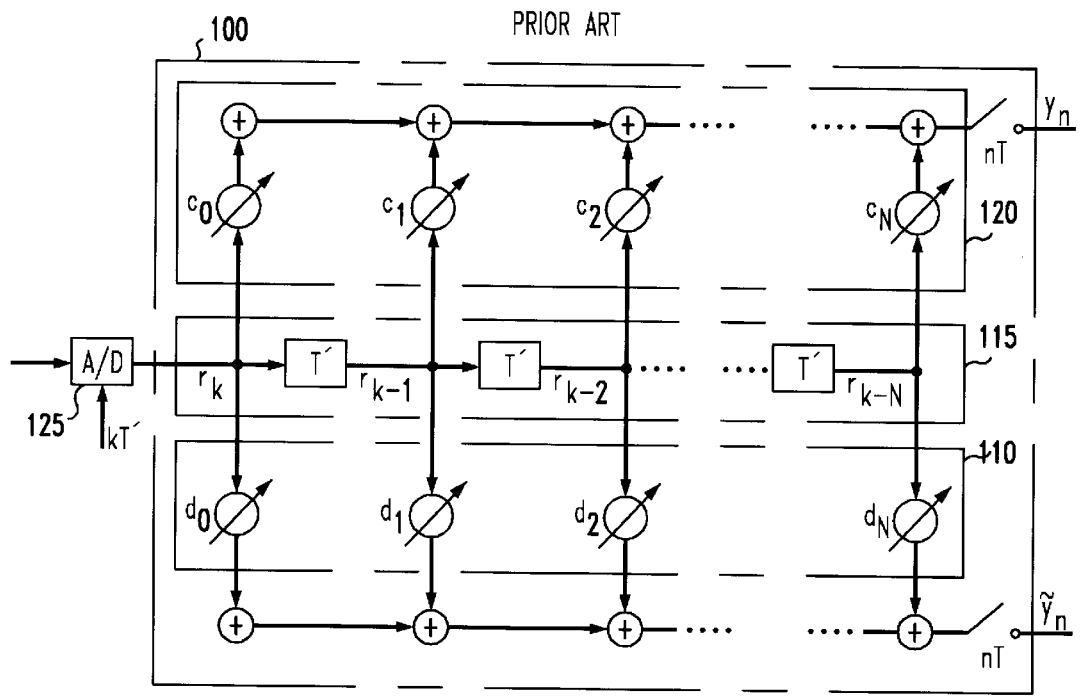
FIG. 3 is an illustrative block diagram of a portion of an adaptive filter for use in an equalizer.

An illustrative phase-splitting FSLE equalizer 100 is shown in FIG. 2. It is assumed that FSLE equalizer 100 operates on an input signal comprising two dimensions: an in-phase component and a quadrature component. FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The outputs of the two adaptive FIR filters 110 and 120 as shown in FIG. 3 are computed at the symbol rate 1/T. The equalizer taps and input samples can be represented by a corresponding N-dimensional vector. As such, the following relationships are now defined:

$r_n^T = [r_k, r_{k-1}, \ldots, r_{k-N}]$ = vector of A/D samples in delay line; (2)

$c_n^T = [c_0, c_1, c_2, \ldots, c_N]$ = vector of in-phase tap coefficients; and (3)

$d_n^T = [d_0, d_1, d_2, \ldots d_N]$ = vector of quadrature phase tap coefficients; (4)

where the superscript T denotes vector transpose, the subscript n refers to the symbol period nT, and k=in.

Let $y_n$ and $\tilde{y}_n$ be the computed outputs of the in-phase and quadrature filters, respectively, and:

$$y_n = c_n^T r_n; \text{ and} \tag{5}$$

$$\tilde{y}_n = d_n^T r_n. \tag{6}$$

Figure 6:
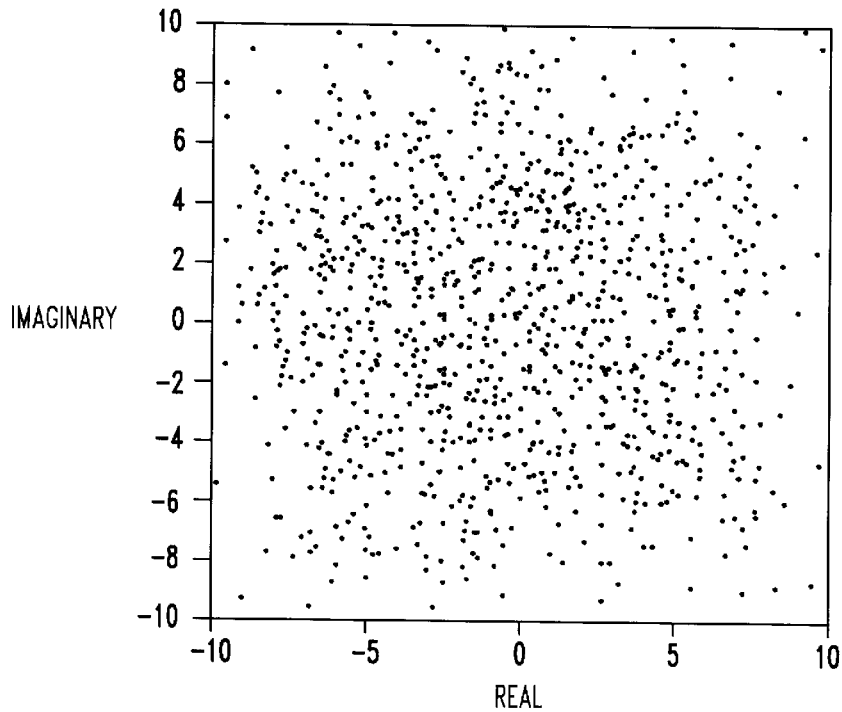
FIG. 6 is an illustrative signal point plot of an output signal of an equalizer before convergence.
Figures 17, 18:
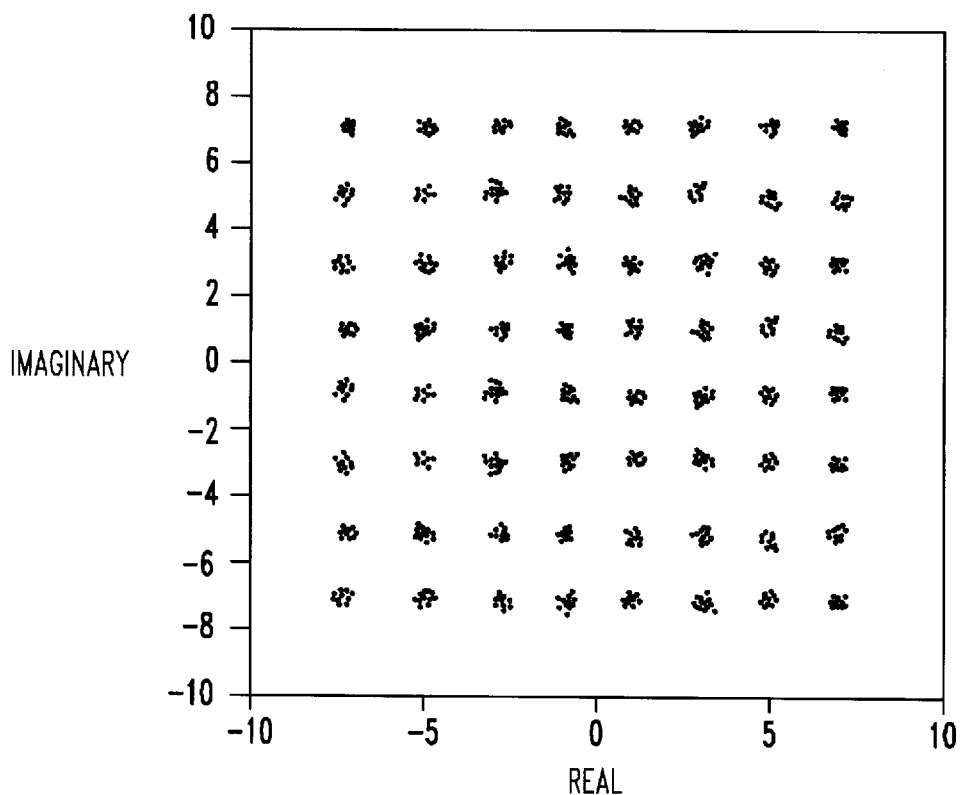
FIG. 18 shows a table providing a general comparison between the RCA, CMA, and MMA, blind equalization methods, without CHCF.

An X/Y display of the outputs $y_n$ and $\tilde{y}_n$ or, equivalently, of the complex output $Y_n = y_n + j\tilde{y}_n$, is called a signal constellation. FIGS. 6 and 17 show a 64-CAP constellation before and after illustrative convergence using the MMA algorithm. (The term "64-CAP," refers to the number of predefined symbols in the signal space or signal constellation each symbol representing 6 bits since $2^6$=64. Additional information on a CAP communications system can be found in J. J. Werner, "Tutorial on Carrierless AM/PM—Part I—Fundamentals and Digital CAP Transmitter," *Contribution to ANSI X3T9.5 TP/PMD Working Group*, Minneapolis, Jun. 23, 1992.) After convergence, the signal constellation consists of a display of the complex symbols $A_n = a_n + jb_n$ corrupted by some small noise and ISI.

In the normal mode of operation, decision devices (or slicers) 130 and 135 shown in FIG. 2 compare the sampled outputs $y_n$ and $\tilde{y}_n$ of equalizer 100 with valid symbol values $a_n$ and $b_n$ and make a decision on which symbols have been transmitted. These sliced symbols will be denoted $\hat{a}_n$ and $\hat{b}_n$. The receiver then computes the following in-phase and quadrature errors $e_n$ and $\hat{e}_n$:

$$e_n = y_n - \hat{a}_n, \tag{7a}$$

$$\tilde{e}_n = \tilde{y}_n - \hat{b}_n, \tag{7b}$$

and the tap coefficients of the two adaptive filters are updated using the familiar least-mean-square (LMS) algorithm, i.e., $$c_{n+1} = c_n - \alpha e_n r_n, \tag{8a}$$

$$d_{n+1} = d_n - \alpha \tilde{e}_n r_n, \tag{8b}$$

where $\alpha$ is the step size used in the tap adjustment algorithm.

Figure 4:
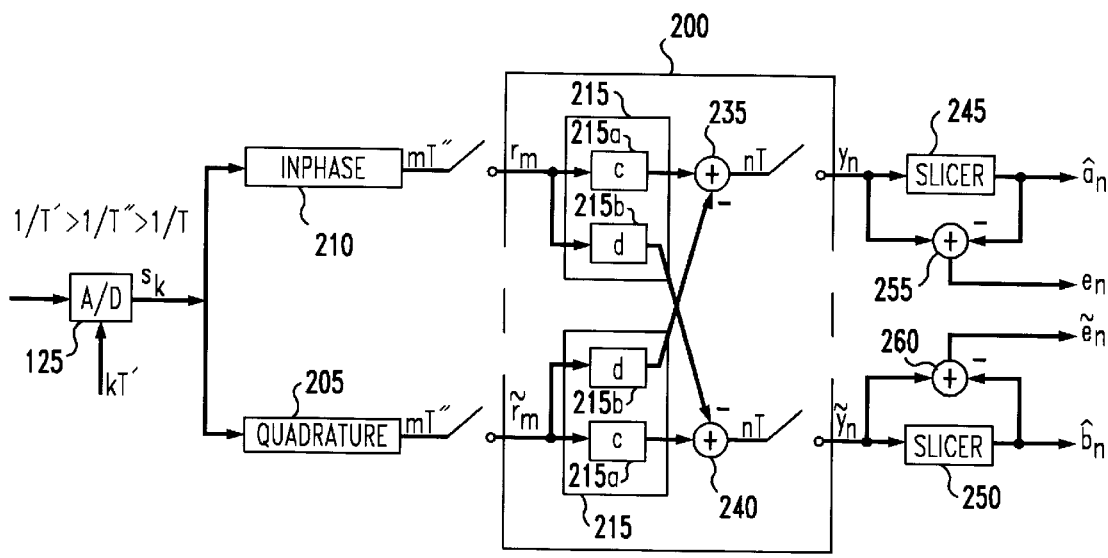
FIG. 4 is an illustrative block diagram of a cross-coupled equalizer.

Turning now to FIG. 4, a cross-coupled FSLE, 200, is shown. For this equalizer structure, the A/D samples are first fed to two fixed in-phase and quadrature FIR filters, 210 and 205, respectively. In this case, the sampling rate 1/T' of A/D 125 is typically equal to four times the symbol rate 1/T. The outputs of the two fixed FIR filters are computed at a rate 1/T" that is consistent with the sampling theorem for analytic signals as known in the art. The output signals are then fed to equalizer 200 having a so-called cross-coupled structure. Typically, 1/T" is twice the symbol rate 1/T.

The cross-coupled equalizer 200 uses two adaptive FIR filters 215a and 215b, each with tap vectors $c_n$ and $d_n$. For simplicity, the same tap vector notations $c_n$ and $d_n$ (which have been used for the previous described equalizer 100 of FIG. 2) are used again. However, it should be clear to those skilled in the art that the tap vectors are different for the two types of equalizers. These two filters are each used twice to compute the outputs $y_n$ and $\tilde{y}_n$ of the equalizer. Let $r_n$ and $\tilde{r}_n$ be the output vectors of the in-phase and quadrature filters that are used to compute the outputs of the cross-coupled equalizer. The following definitions can be made:

$$C_n = c_n + jd_n, \tag{9a}$$

$$R_n = r_n + j\tilde{r}_n, \text{ and} \tag{9b}$$

$$Y_n = y_n + j\tilde{y}_n. \tag{9c}$$

The complex output $Y_n$ of the equalizer can be written in the following compact way:

$$Y_n = C_n^{*T} R_n, \qquad (10)$$

where the asterisk * denotes complex conjugate. Making the following definitions for the sliced complex symbol $\hat{A}_n$ and the complex error $E_n$:

$$\hat{A}_n = \hat{a}_n + j\hat{b}_n, \qquad (11a)$$

$$E_n = Y_n - \hat{A}_n. \qquad (11b)$$

The LMS algorithm for updating the complex tap vector $C_n$ can be written as:

$$C_{n+1} = C_n - \alpha E_n^* R_n. \qquad (12)$$

Figure 5:
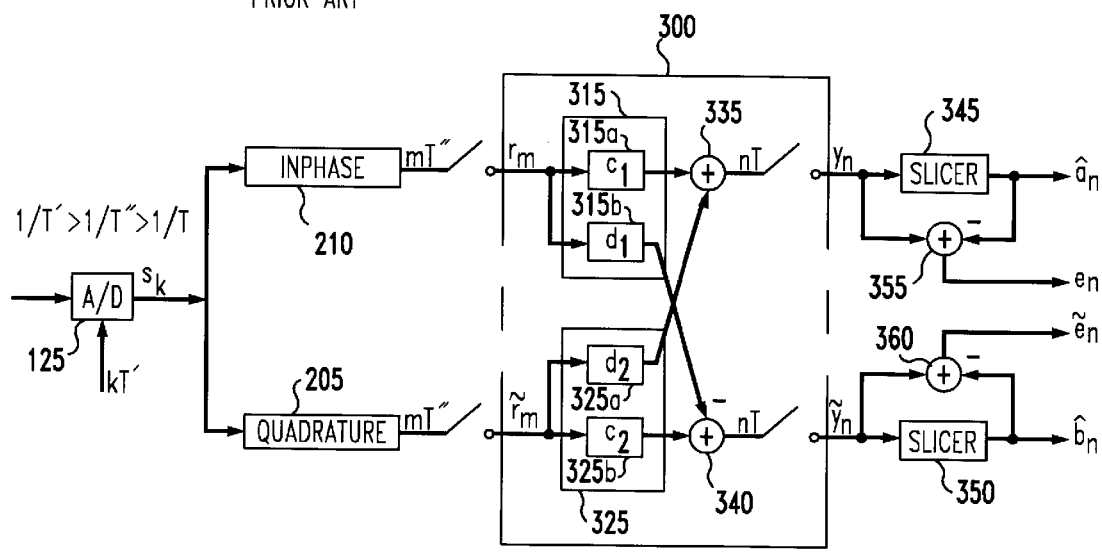
FIG. 5 is an illustrative block diagram of a four-filter equalizer.

Turning now to FIG. 5, a four-filter FSLE is shown. Four-filter equalizer 300 has the same general structure as cross-coupled FSLE 200 shown in FIG. 4, except that the adaptive portion consists of four different filters rather than two filters which are used twice. For this reason it is called a four-filter FSLE. The two output signals of equalizer 300 are computed as follows:

$$y_n = c_{1,n}^T r_n + d_{2,n}^T \tilde{r}_n, \text{ and} \qquad (13a)$$

$$\tilde{y}_n = c_{2,n}^T \tilde{r}_n - d_{1,n}^T r_n. \qquad (13b)$$

Using the definitions for the in-phase and quadrature errors $e_n$ and $\tilde{e}_n$ in equations (7a) and (7b), the following tap updating algorithms for the four filters result:

$$c_{1,n+1} = c_{1,n} - \alpha e_n r_n, \qquad (14a)$$

$$d_{1,n+1} = d_{1,n} + \alpha \tilde{e}_n r_n, \qquad (14b)$$

$$c_{2,n+1} = c_{2,n} - \alpha \tilde{e}_n \tilde{r}_n, \text{ and} \qquad (15a)$$

$$d_{2,n+1} = d_{2,n} - \alpha e_n \tilde{r}_n. \qquad (15b)$$

Having generally described the structure of some prior-art equalizers as shown in FIGS. 2–5, a general overview of the concept of blind equalization will now be described using the equalizer structure of FIG. 2.

Concept of Blind Equalization

In the normal (steady-state) mode of operation, the decision devices in FIG. 2, i.e., slicers 130 and 135, compare the equalizer complex output samples, $Y_n$, (where $Y_n = y_n + j\tilde{y}_n$), with all the possible transmitted complex symbols, $A_n$ (where $A_n = a_n + jb_n$), and selects the symbol $\hat{A}_n$ which is the closest to $Y_n$. The receiver then computes an error, $E_n$, where:

$$E_n = Y_n - \hat{A}_n, \qquad (16)$$

which is used to update the tap coefficients of equalizer 100. This type of tap adaptation is called "decision directed", because it uses the decisions of slicers 130 and 135. The most common tap updating algorithm is the LMS algorithm, which is a stochastic gradient algorithm that minimizes the mean square error (MSE), which is defined as:

$$MSE \triangleq E[|E_n|^2] = E[|Y_n - \hat{A}_n|^2] = E[e_n^2] + E[\tilde{e}_n^2], \qquad (17)$$

where $E[.]$ denotes expectation and $e_n$ and $\tilde{e}_n$ are in-phase and quadrature errors, respectively.

At the beginning of start-up, the output signal of equalizer 100, $Y_n$, is corrupted by a lot of intersymbol interference, as illustrated in FIG. 6. The latter represents experimental data obtained for a 64-CAP receiver using a phase-splitting FSLE as represented by FIG. 2.

When a training sequence is used during start-up (i.e., a predefined sequence of $A_n$ symbols), the receiver can compute meaningful errors $E_n$ by using the equalizer output signal $Y_n$ and the known sequence of transmitted symbols $A_n$. In this case, tap adaptation is said to be done with "ideal reference" to distinguish it from decision directed tap adaptation.

However, when no training sequence is available, equalizer 100 has to be converged blindly. In this case, a decision-directed tap updating algorithm cannot be used to converge the equalizer, because the slicer makes too many wrong decisions, as should be apparent from FIG. 6.

As such, the philosophy of blind equalization is to use a tap adaptation algorithm that minimizes a cost function that is better suited to provide initial convergence of equalizer 100 than the MSE represented by equation (17). The cost functions used in the RCA, CMA, and MMA algorithms are described below.

Convergence of an equalizer during blind start-up usually consists of two main teps. First, a blind equalization algorithm is used to open the "eye diagram." (Hereafter, his will be referred to as "it opens the eye.") Once the eye is open enough, the receiver witches to a decision directed tap adaptation algorithm.

Reduced Constellation Algorithm (RCA)

This section provides a general overview of the RCA algorithm. This general overview is then followed with a description of the RCA algorithm in the context of each of the illustrative equalizer structures, described above.

Figure 8:
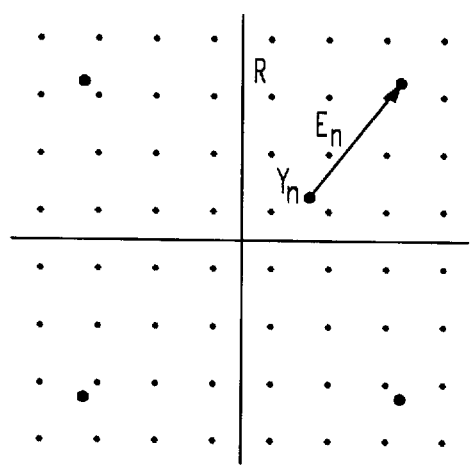
FIG. 8 is an illustrative signal point plot illustrating the reduced signal point constellation of the RCA blind equalization method.

With the RCA algorithm, the error used in the tap updating algorithm is derived with respect to a signal constellation that has a smaller number of points than the received constellation. As illustration, it is again assumed that the signal constellation comprises 64 symbols. In the RCA algorithm, the reduced constellation typically consists of four signal points only, as shown in FIG. 8. It should be noted that the RCA algorithm requires the use of a decision device, e.g., a slicer, to select the closest signal point from the reduced constellation. The error between the received sample $Y_n$ and the closest signal point $\hat{A}_{r,n}$ of the reduced constellation is the complex number:

$$E_{r,n} = e_{r,n} + j\tilde{e}_{r,n} = Y_n - \hat{A}_{r,n}, \text{ where} \qquad (18)$$

$$\hat{A}_{r,n} = \hat{a}_{r,n} + j\hat{b}_{r,n} = R[sgn(y_n) + jsgn(\tilde{y}_n)], \text{ and} \qquad (19)$$

where sgn (.) is the signum function and the expression on the right corresponds to the case where the reduced constellation consists of four points. The reduced constellation algorithm minimizes the following cost function:

$$CF = E[|E_{r,n}|^2] = E[e_{r,n}^2 + \tilde{e}_{r,n}^2] = E[|Y_n - \hat{A}_{r,n}|^2], \qquad (20)$$

where $E[.]$ denotes expectation and where $e_{r,n}$ refers to the slicer error.

Now, consider the phase-splitting equalizer structure shown in FIG. 2. Using equations (5), (6), and (20), the following equations result:

$$e_{r,n} = y_n - \hat{a}_{r,n} = c_n^T r_n - R\, sgn(y_n), \qquad (21a)$$

$$\tilde{e}_{r,n} = \tilde{y}_n - \hat{b}_{r,n} = d_n^T r_n - R\, sgn(\tilde{y}_n) \qquad (21b)$$

The gradients of the cost function represented by equation (20) with respect to the tap vectors $c_n$ and $d_n$ are equal to:

$$\nabla_c(CF) = 2E[e_{r,n} r_n], \text{ and} \qquad (22a)$$

$$\nabla_d(CF)=2E[\tilde{e}_{r,n}\tilde{r}_n].\quad(22b)$$

These gradients are equal to zero when the channel is perfectly equalized, i.e., when the received samples $Y_n$ are equal to the symbol values $A_n$. This condition leads to the following value of R:

$$R = \frac{E[a_n^2]}{E[|a_n|]}.\quad(23)$$

For example, consider the gradient with respect to the tap vector $c_n$. From the left of equations (21a) and (21b) there is the condition: $E[(y_n-R\ sgn(y_n))r_n]=0$. With perfect equalization $y_n=a_n$. Also, if it is assumed that different symbols are uncorrelated, then: $E[a_n r_n]=k_n E[a_n^2]$, where $k_n$ is a fixed vector whose entries are a function of the channel. The above condition can then be written as: $E[a_n^2]-R\ E[sgn(a_n) a_n]=0$. Noting that $sgn(a_n)a_n=|a_n|$ and solving for R, equation (23) results.

The nonaveraged gradients in equations (22a) and (22b) can be used in a stochastic gradient algorithm to adapt the tap coefficients of the equalizer, so that the following tap updating algorithms result:

$$c_{n+1}=c_n-\alpha[y_n-R\ sgn(y_n)]r_n,\text{ and}\quad(24a)$$

$$d_{n+1}=d_n-\alpha[\tilde{y}_n-R\ sgn(\tilde{y}_n)]\tilde{r}_n.\quad(24b)$$

Turning now to the cross-coupled FSLE structure illustrated by FIG. 4, the complex output $Y_n$ of this equalizer is computed from equation (10). Using this expression in equation (20), the gradient of the cost function with respect to the complex tap vector $C_n$ is:

$$\nabla_C=E[(Y_n-\hat{A}_{r,n})^* R_n].\quad(25)$$

Assuming a perfectly equalized channel the following expression for R results:

$$R = \frac{E[|A_n|^2]}{E[|a_n|]+E[|b_n|]} = \frac{E[|A_n|^2]}{2E[|a_n|]},\quad(26)$$

where the expression on the right is the same as the one in equation (23) for the usual case where $E[|a_n|]=E[|b_n|]$. The tap updating algorithm for the complex tap vector $C_n$ is given by $$C_{n+1}=C_n-\alpha(Y_n-\hat{A}_{r,n})^* R_n.\quad(27)$$

Turning now to the four-filter FSLE structure illustrated by FIG. 5, the outputs $y_n$ and $\tilde{y}_n$ of this four-filter equalizer structure are computed from equations (13a) and (13b). The gradients of the cost function in equation (20) with respect to the four tap vectors are similar to the ones given in equations (22a) and (22b) and will not be repeated here. The tap updating algorithms are given by:

$$c_{1,n+1}=c_{1,n}-\alpha[y_n-R\ sgn(y_n)]r_n,\quad(28a)$$

$$d_{1,n+1}=d_{1,n}+\alpha[\tilde{y}_n-R\ sgn(\tilde{y}_n)]r_n\quad(28b)$$

$$c_{2,n+1}=c_{2,n}-\alpha[\tilde{y}_n-R\ sgn(\tilde{y}_n)]\tilde{r}_n,\text{ and}\quad(28c)$$

$$d_{2,n+1}=d_{2,n}-\alpha[y_n-R\ sgn(y_n)]\tilde{r}_n,\quad(28d)$$

where the constant R is the same as in equation (23).

The main advantage of RCA is its low cost of implementation because it is typically the least complex of blind equalization algorithms. The tap updating algorithms represented by equations (24a), (24b), (27) and (28) are the same as the standard LMS algorithms represented by equations (8a) and (8b) except that the slicer uses a different number of points.

The main disadvantages of RCA are its unpredictability and lack of robustness. The algorithm is known to often converge to so-called "wrong solutions." These solutions are quite acceptable from a channel equalization perspective, but do not allow the receiver to recover the right data. It should be pointed out that the equalizer structure in FIG. 2 is much more likely to converge to wrong solutions than the structure in FIG. 4. This is due to the fact that the former has many more degrees of freedom than the latter.

Figure 16:
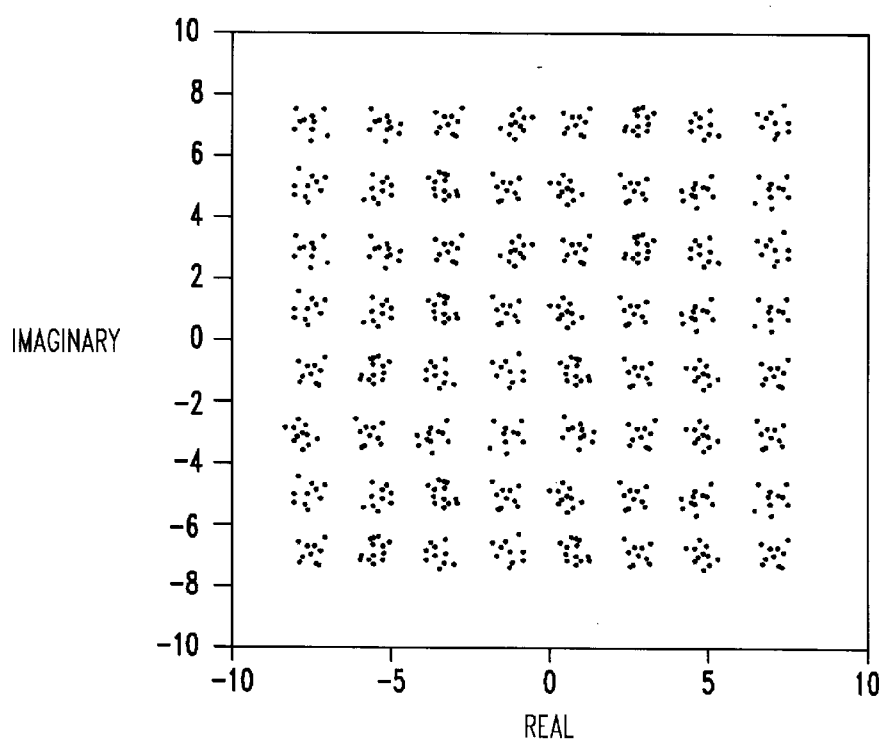
FIGS. 16 and 17 are illustrative signal point plots of an output signal of an equalizer for a communications system using a two-step MMA blind equalization method.
Figure 20:
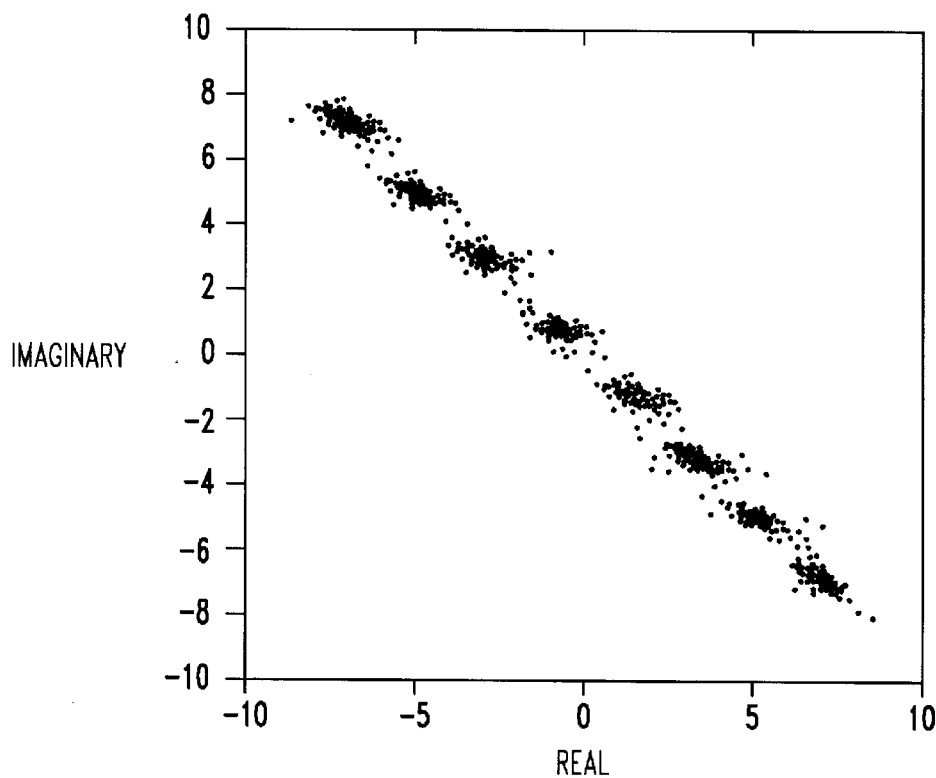
FIG. 20 is an illustrative graph of an incorrect diagonal solution for a 64-CAP signal point constellation.

A wrong solution that is often observed with the equalizer structure in FIG. 2 is the so-called diagonal solution. In this case, the in-phase and quadrature filters both converge to the same filter, so that they both generate the same output samples. As a result, the signal constellation at the output of the equalizer consists of points clustered along a diagonal as illustrated in FIG. 20 for a 64-CAP signal point constellation. It has been found that frequency of occurrence of diagonal solutions is mostly communications channel dependent. Specifically, it is created when certain fractional propagation delay offsets are introduced in the channel. (As a point of contrast, FIG. 16 shows an illustrative correct solution for a 64-CAP signal point constellation using the MMA blind equalization algorithm.)

Other wrong solutions can occur when the in-phase and quadrature filters introduce propagation delays which differ by an integral number of symbol periods. As an example, at a given sampling instant, $a_n$ may appear at the output of the in-phase filter while $b_{n-1}$ appears at the output of the quadrature filter. This kind of wrong solution can generate points in the signal constellation at the output of the equalizer that do not correspond to transmitted symbols. For example, a 32-point signal constellation may be converted into a 36-point constellation and the 128-point constellation in FIGS. 13, 14, and 15 may be converted into a 144-point constellation.

Constant Modulus Algorithm (CMA)

This section provides a general overview of the CMA algorithm. This general overview is then followed with a description of the CMA algorithm in the context of each of the illustrative equalizer structures, described above.

Figure 9:
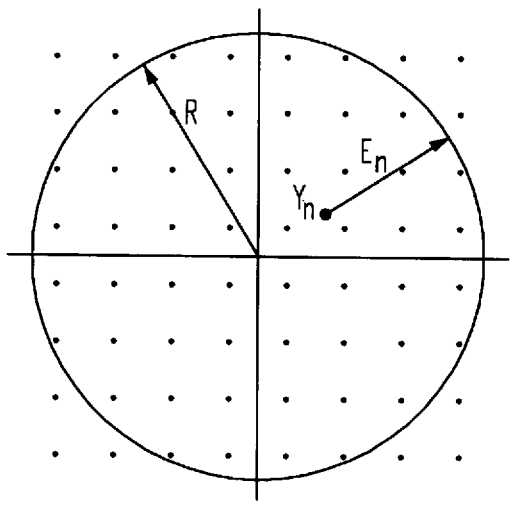
FIG. 9 is an illustrative signal point plot illustrating the circular contour of the CMA blind equalization method.

The CMA algorithm minimizes the dispersion of the equalized samples $Y_n$ with respect to a circle with radius R. This is graphically illustrated in FIG. 9. The CMA algorithm minimizes the following cost function:

$$CF=E[(|Y_n|^L-R^L)^2],\quad(29)$$

where L is a positive integer. The case L=2 is the most commonly used in practice. The cost function in equation (29) is a true two-dimensional cost function which minimizes the dispersion of the equalizer complex output signal $Y_n$ with respect to a circular two-dimensional contour.

Now, consider the phase-splitting equalizer structure shown in FIG. 2. The gradients of the cost function with respect to the tap vectors $c_n$ and $d_n$ are given by:

$$\nabla_c(CF)=2L\times E[(|Y_n|^L-R^L)|Y_n|^{L-2}y_n r_n],\text{ and}\quad(30a)$$

$$\nabla_d(CF)=2L\times E[(|Y_n|^L-R^L)|Y_n|^{L-2}\tilde{y}_n r_n].\quad(30b)$$

Assuming a perfectly equalized channel the following value for $R^L$ results:

$$R = \frac{E[|A_n|^{2L-2}a_n^2]}{E[|A_n|^{L-2}a_n^2]} = \frac{E[|A_n|^{2L}]}{E[|A_n|^L]},\quad(31)$$

where the expression on the right holds for the usual case where the statistics of the symbols $a_n$ and $b_n$ are the same.

For L=2, the following stochastic gradient tap updating algorithms results:

$$c_{n+1}=c_n-\alpha(y_n^2+\tilde{y}_n^2-R^2)y_n r_n, \text{ and} \qquad (32a)$$

$$d_{n+1}=d_n-\alpha(y_n^2+\tilde{y}_n^2-R^2)\tilde{y}_n r_n. \qquad (32b)$$

Turning now to the cross-coupled FSLE structure illustrated by FIG. 4, the gradient of the cost function represented by equation (29) with respect to the complex tap vector $C_n$ is equal to:

$$\nabla_c(CF)=2L\times E[(|Y_n|^L-R^L)|Y_n|^{L-2}Y_n^* R_n]. \qquad (33)$$

For L=2, the tap updating algorithm for the complex tap vector becomes:

$$C_{n+1}=C_n-\alpha(|Y_n|^2-R^2)Y_n^* R_n, \qquad (34)$$

where R is given by the expression on the right in equation (31).

Turning now to the four-filter FSLE structure illustrated by FIG. 5, the gradients of the cost function represented by equation (29) with respect to the four tap vectors are similar to the ones given by equations (30a) and (30b). For L=2, the tap updating algorithms become:

$$c_{1,n+1}=c_{1,n}-\alpha(y_n^2+\tilde{y}_n^2-R^2)y_n r_n, \qquad (35a)$$

$$d_{1,n+1}=d_{1,n}+\alpha(y_n^2+\tilde{y}_n^2-R^2)\tilde{y}_n r_n, \qquad (35b)$$

$$c_{2,n+1}=c_{2,n}-\alpha(y_n^2+\tilde{y}_n^2-R^2)\tilde{y}_n \tilde{r}_n, \text{ and} \qquad (35c)$$

$$d_{2,n+1}=d_{2,n}-\alpha(y_n^2+\tilde{y}_n^2-R^2)y_n \tilde{r}_n. \qquad (35d)$$

The constant R is the same as in equation (31).

The main advantages of CMA are its robustness and predictability. Unlike RCA, it rarely converges to wrong solutions. For some applications, other than those considered here, it also has the advantage of being able to partially equalize the channel in the presence of carrier phase variations. The main disadvantage of CMA is its cost of implementation. The CMA tap updating algorithm is more complex than that of the RCA algorithm and the MMA algorithm and, in addition, the CMA algorithm requires a so-called "rotator" at the output of the equalizer. As a result, once a certain degree of convergence is achieved, the output signal of the equalizer must be counter-rotated before switching to a decision-directed tap adaptation algorithm. The need to use a rotator after the equalizer increases the cost of implementation of CMA for some types of applications. It should be pointed out, however, that there are other applications, such as voiceband and cable modems, where the rotator function is required anyway for other purposes, such as tracking frequency offset introduced in the channel. In these latter cases, the need to do a rotation does not increase the cost of implementation, and CMA becomes a very attractive approach.

Multimodulus Algorithm (MMA)

Figure 10:
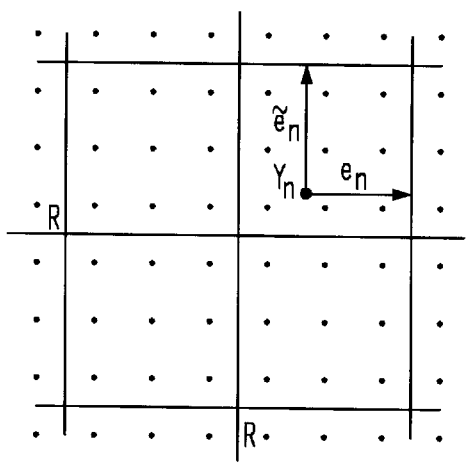
FIG. 10 is an illustrative signal point plot illustrating the piecewise linear contours of the MMA blind equalization method.

The MMA algorithm minimizes the dispersion of the equalizer output samples $y_n$ and $\tilde{y}_n$ around piecewise linear in-phase and quadrature contours. For the special case of square signal constellations of the type used for 16-, 64-, and 256-CAP systems, the contours become straight lines. This is graphically illustrated in FIG. 10 for a 64-point constellation. The multimodulus algorithm minimizes the following cost function:

$$CF=E\ [(y_n^L-R^L(Y_n))^2+(\tilde{y}_n^L-R^L(Y_n))^2], \qquad (36)$$

where L is a positive integer and $R(Y_n)$ and $\tilde{R}(Y_n)$ take discrete positive values, which depend on the equalizer outputs $Y_n$.

Multimodulus Algorithm (MMA)—Square Constellations

For square constellations, $R(Y_n)=\tilde{R}(Y_n)=R$=constant, so that the cost function of equation (36) becomes:

$$CF=CF_I+CF_Q=E[(y_n^L-R^L)^2+(\tilde{y}_n^L-R^L)^2]. \qquad (37)$$

Unlike the cost function for CMA represented by equation (29), this is not a true two-dimensional cost finction. Rather, it is the sum of two independent one-dimensional cost functions $CF_I$ and $CF_Q$. The application of the MMA algorithm in the context of the three illustrative types of equalizers (described above) will now be described.

For the phase-splitting equalizer structure shown FIG. 2, the gradients of the cost function in equation (37) with respect to the tap vectors $c_n$ and $d_n$ are equal to:

$$\nabla_c(CF)=2L\times E[(|y_n|^L-R^L)|y_n|^{L-2}y_n r_n], \text{ and} \qquad (38a)$$

$$\nabla_d(CF)=2L\times E[(|\tilde{y}_n|^L-R^L)|\tilde{y}_n|^{L-2}\tilde{y}_n r_n]. \qquad (38b)$$

Assuming a perfectly equalized channel, the following value for $R^L$ results:

$$R^L=\frac{E[a_n^{2L}]}{E[|a_n|^L]} \qquad (39)$$

The best compromise between cost and performance is achieved with L=2, in which case the tap updating algorithms become $$c_{n+1}=c_n-\alpha(y_n^2-R^2)y_n r_n, \text{ and} \qquad (40a)$$

$$d_{n+1}=d_n-\alpha(\tilde{y}_n^2-R^2)\tilde{y}_n r_n. \qquad (40b)$$

Turning now to the cross-coupled FSLE structure illustrated by FIG. 4, the gradient of the cost function represented by equation (37) with respect to the complex tap vector $C_n$ is given by:

$$\nabla_c(CF)=2L\times E[K^* R_n], \qquad (41)$$

where, $$K=[(|y_n|^L-R^L)|y_n|^{L-2}y_n]+j[(|\tilde{y}_n|^L-R^L)|\tilde{y}_n|^{L-2}\tilde{y}_n]. \qquad (42)$$

Assuming a perfectly equalized channel, the value for $R^L$ is:

$$R^L=\frac{E[a_n^{2L}+b_n^{2L}]}{E[|a_n|^L+|b_n|^L]}, \qquad (43)$$

which reduces to equation (39) for the usual case where the symbols $a_n$ and $b_n$ have the same statistics. For L=2, the tap updating algorithm for the complex tap vector $C_n$ becomes:

$$C_{n+1}=C_n-\alpha K^* R_n, \qquad (44)$$

where, $$K=(y^2-R^2)y+j(\tilde{y}^2-R^2)\tilde{y}. \qquad (45)$$

Turning now to the four-filter FSLE structure illustrated by FIG. 5, the gradients of the cost function represented by equation, (37) with respect to the four tap vectors are similar to the ones given in equations (38a) and (38b). For L=2, the tap updating algorithms become:

$$c_{1,n+1}=c_{1,n}-\alpha(y_n^2-R^2)y_n r_n, \qquad (46a)$$

$$d_{1,n+1}=d_{1,n}+\alpha(\tilde{y}_n^2-R^2)\tilde{y}_n r_n, \qquad (46b)$$

$$c_{2,n+1}=c_{2,n}-\alpha(\tilde{y}_n^2-R^2)\tilde{y}_n \tilde{r}_n, \text{ and} \qquad (46c)$$

$$d_{2,n+1}=d_{2,n}-\alpha(y_n^2-R^2)y_n \tilde{r}_n. \qquad (46d)$$

The constant R is the same as in equation (39).

Figure 7:
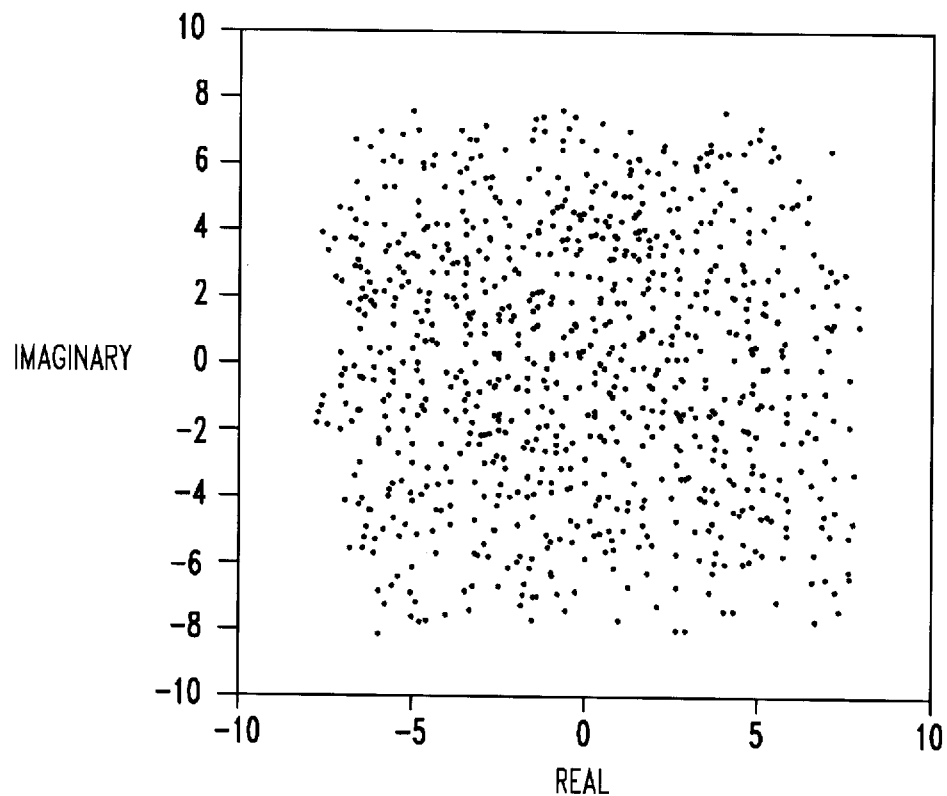
FIG. 7 is an illustrative signal point plot of an output signal of an equalizer for a system using the MMA blind equalization method.

The above-mentioned two-step blind equalization procedure utilizing the MMA algorithm is graphically illustrated by FIGS. 6, 7, 16, and 17 for equalizer 100. The output signal of equalizer 100, before any form of convergence, is shown in FIG. 6. As noted above, FIG. 6 represents experimental data obtained for a 64-CAP receiver using a phase-splitting FSLE as represented by FIG. 2. FIG. 7 illustrates the beginning of the MMA process convergence. As shown in FIG. 16, the MMA technique converges the equalizer enough to clearly illustrate the 64-symbol signal space as 64 noisy clusters. Although these noisy clusters would, typically, not be acceptable for steady-state operation—the eye is open enough to allow the receiver to switch to a 64-point slicer and a decision-directed LMS algorithm. The end result is a much cleaner constellation, as shown in FIG. 17. Typically, a clean transition can be made between the two modes of adaptation, MMA and decision directed, when the symbol error rate is better than $10^{-2}$, although successful transitions have been observed for worse symbol error rates. It should be pointed out that the noisy clusters in FIG. 16 could be further reduced by decreasing the step size in the MMA tap adjustment algorithm. Indeed, in some applications it may be possible to eliminate the switching to a decision directed tap adaptation algorithm. However, it should be noted that this would increase the start-up time and the required amount of digital precision.

The MMA algorithm for square constellations can be used without modification for nonsquare constellations. In this case, caution has to be exercised in the computation of the constant R, because the discrete levels for the symbols $a_n$ and $b_n$ do not all have the same probability of occurrence (described below). However, it has been found through computer simulations that convergence of the MMA algorithm is somewhat less reliable for nonsquare constellations than for square constellations. This can be corrected by using the modified MMA discussed in the following section.

Multimodulus Algorithm (MMA)—NonSquare Constellations

Figure 13:
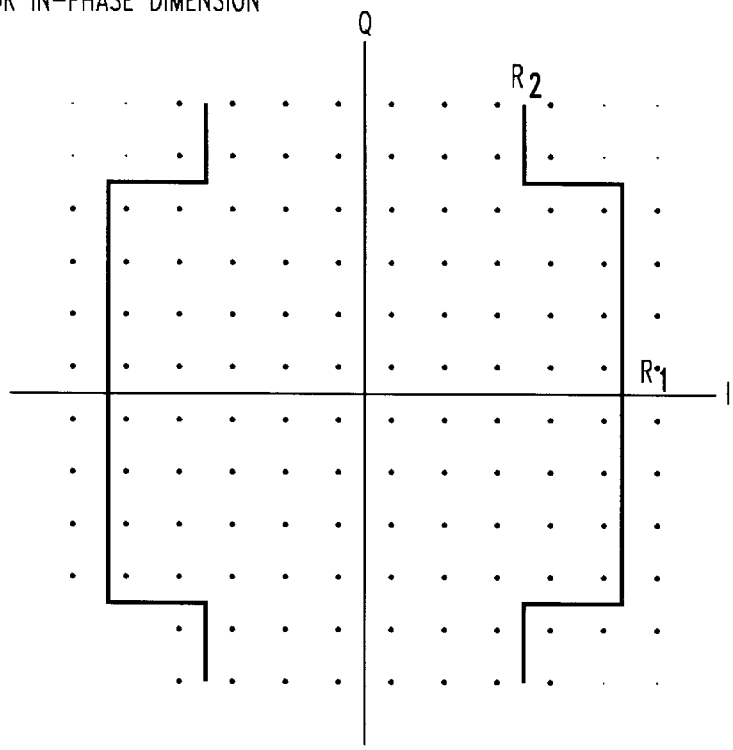
FIGS. 13, 14, and 15, are illustrative signal point plots illustrating the piecewise linear contours of the MMA blind equalization method for a nonsquare constellation.
Figure 14:
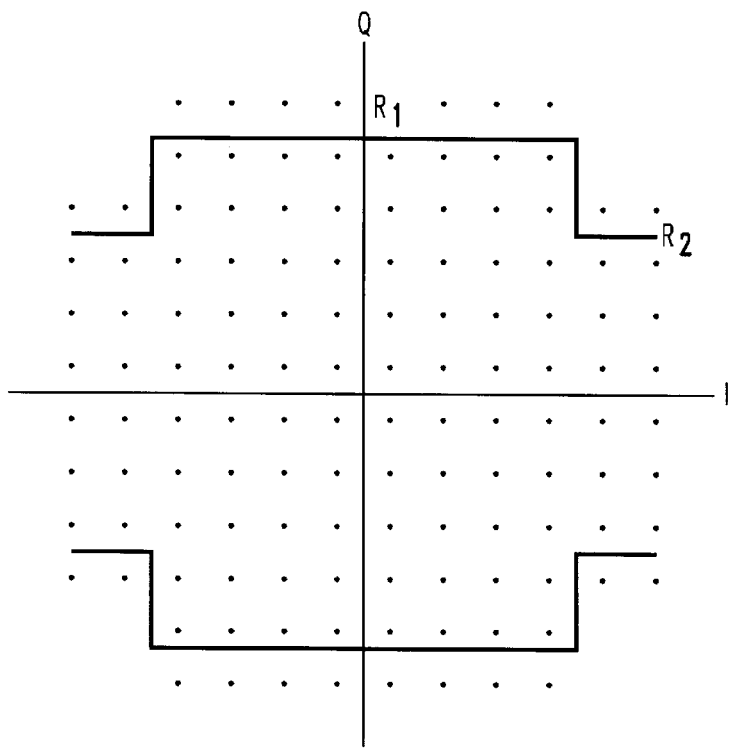
Figure 15:
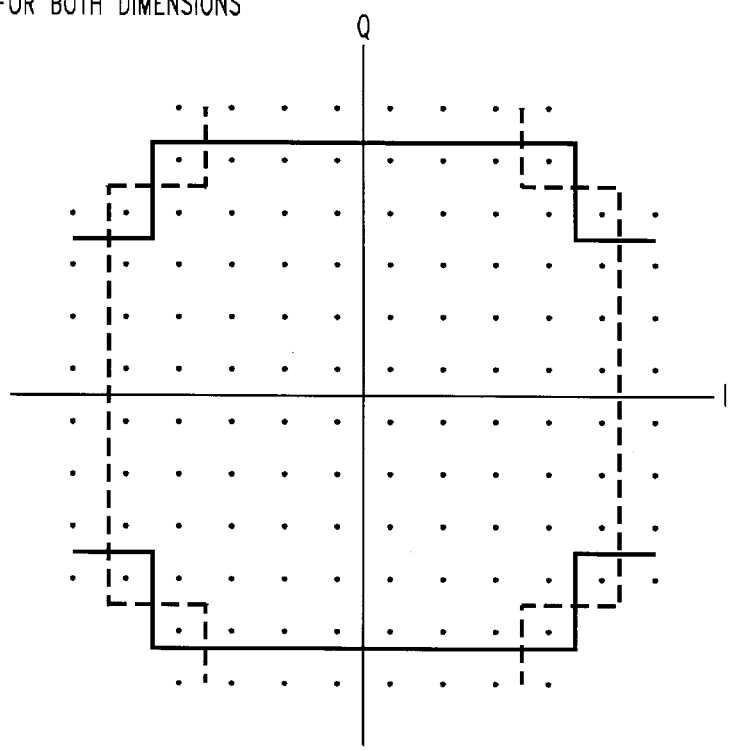

The principle of the modified MMA is illustrated in FIGS. 13, 14, and 15, with respect to a 128-CAP signal constellation. (A 128-point signal constellation is obtained in the following way. First define a 144-point signal constellation using the symbol levels ±1,±3,±5,±7,±9,±11, and then remove the four corner points in each quadrant.) Minimization of the dispersion of the equalizer output samples $y_n$ and $\tilde{y}_n$ is now done around piecewise straight lines. Again, this is done independently for $y_n$ and $\tilde{y}_n$. The quadrature cost functions derived from equation (37) are:

$$CF_Q=E[(\tilde{y}_n^L-R_1^L)^2] \text{ if } |y_n|<K, \text{ and} \qquad (47a)$$

$$CF_Q=E[(\tilde{y}_n^L-R_2^L)^2] \text{ if } |y_n|>K. \qquad (47b)$$

The in-phase cost functions derived from equation (37) are:

$$CF_I=E[(y_n^L-R_1^L)^2] \text{ if } |\tilde{y}_n|<K, \text{ and} \qquad (47c)$$

$$CF_I=E[(y_n^L-R_2^L)^2] \text{ if } |\tilde{y}_n|>K. \qquad (47d)$$

The constant K is a finction of the signal constellation under consideration and is determined empirically. In computer simulations for 128-CAP, a suggested value is K=8. Two different moduli $R_1$ and $R_2$ are used in equations (47) because the symbols $a_n$ and $b_n$ used in the 128-point constellation have two sets of levels {±1,±3,±5,±7} and {±9, ±11} which have a different probability of occurrence. More moduli can be used if there are more than two sets of symbol levels with different statistics.

The moduli $R_1$ and $R_2$ in equations (47) are computed from equation (39) by evaluating the moments of the symbols over the set of symbol levels to which a given modulus applies (additionally described below). As an example, consider FIG. 13, which illustrates the moduli for the in-phase dimension, and which applies to the real symbols $a_n$ of a 128-CAP signal constellation. The moments of the symbols can be computed by considering the first quadrant only. Consider the subset of 24 symbols in this quadrant that applies to $R_1$. For these symbols $a_n$=1, 3, 5, 7, 9, 11; and $b_n$=1, 3, 5, 7; so that each value of $a_n$ occurs with probability $4/24=1/6$. Similarly, the $R_2$ subset has 8 symbols for which $a_n$=1, 3, 5, 7 and $b_n$=9, 11, so that each value of $a_n$ occurs with probability $2/8=1/4$. Thus, the variance of the symbols becomes:

for $R_1$ symbols, $E[a_n^2]=1/6(1^2+3^2+5^2+7^2+9^2+11^2)\approx 47.67$, and (48a)

for $R_2$ symbols, $E[a_n^2]=1/4(1^2+3^2+5^2+7^2)=21$. (48b)

Other moments of the symbols are computed in a similar fashion and then used in equation (39) to evaluate the values of the various moduli.

The tap updating algorithms for the modified MMA algorithm are the same as the ones given in equations (40), (44), and (46), except that the constant R is replaced by either $R_1$ or $R_2$ depending on which equalizer output sample $Y_n$ is received. FIG. 14 illustrates the Moduli for the quadrature dimension and which applies to the symbols $b_n$ of the 128-CAP signal constellation. It should be apparent from FIG. 15, which represents the union of FIGS. 13 and 14, that the in-phase and quadrature tap updating algorithms need not use the same moduli $R_1$ or $R_2$ in a given symbol period.

Moments of Data Symbols

The following description discusses the concept of "moments of data symbols." In particular, the closed-form expressions for the moments $E[|a_n|^L]$, $E[|b_n|^L]$, and $E[|A_n|^L]$ when the symbols $a_n$ and $b_n$ take values proportional to the odd integers ±1,±3,±5,±7, . . . , are presented. These expressions are then used to get closed-form expressions for the constants R used in the three blind equalization algorithms and illustrated in the table of FIG. 19 (described below).

First, it is assumed that the symbols $a_n$ and $b_n$ have the same statistics, so that $E[a_n^L]=E[b_n^L]$. Consider first the following known summations of powers of integers:

$$\sum_{k=1}^{m} k = \frac{1}{2} m(m+1), \qquad (49a)$$

$$\sum_{k=1}^{m} k^2 = \frac{1}{6} m(m+1)(2m+1), \qquad (49b)$$

$$\sum_{k=1}^{m} k^3 = \frac{1}{4} [m(m+1)]^2, \text{ and} \qquad (49c)$$

$$\sum_{k=1}^{m} k^4 = \frac{1}{30} m(m+1)(2m+1)(3m^2+3m-1). \qquad (49d)$$

These summations can be used to find closed-form expressions for sums of powers of odd integers. For example, for power one:

$$(1 + 3 + 5 + 7) = (1 + 2 + 3 + 4 + 5 + 6 + 7) - 2(1 + 2 + 3) \rightarrow \quad (50)$$

$$\sum_{k=1}^{m} (2k-1) = \sum_{k=1}^{2m-1} k - 2 \sum_{k=1}^{m-1} k - m^2,$$

where the two summations in the middle have been evaluated by using the closed-form expression of equation (49a). Similar series manipulations can be used for other sums of powers of odd integers.

Now, consider square signal constellations which use symbols $a_n$ and $b_n$ with values $\pm 1, \pm 3, \pm 5, \pm 7, \ldots \pm (2m-1)$, where m is the number of different symbol levels (in magnitude). As an example, for the 4-CAP, 16-CAP, 64-CAP, and 256-CAP square signal constellations, m=1, 2, 4, and 8, respectively. It is also assumed that all the symbol values are equiprobable. As a result, the moments of the symbols $a_n$ are:

$$E[|a_n|] = \frac{1}{m} \cdot \sum_{k=1}^{m} (2k-1) = m, \quad (51)$$

$$E[a_n^2] = \frac{1}{m} \cdot \sum_{k=1}^{m} (2k-1)^2 = \frac{1}{3}(4m^2 - 1), \quad (52)$$

$$E[|a_n|^3] = \frac{1}{m} \cdot \sum_{k=1}^{m} (2k-1)^3 = m(2m^2 - 1), \text{ and} \quad (53)$$

$$E[a_n^4] = \frac{1}{m} \cdot \sum_{k=1}^{m} (2k-1)^4 = \frac{1}{15}(4m^2 - 1)(12m^2 - 7). \quad (54)$$

Next, consider the complex symbols $A_n = a_n + jb_n$. Assuming that the symbols $a_n$ and $b_n$ are uncorrelated, the following expressions for the even moments of the complex symbols result:

$$E[|A_n|^2] = 2E[a_n^2], \text{ and} \quad (55a)$$

$$E[|A_n|^4] = 2E[a_n^4] + 2[E|a_n^2|]^2. \quad (55b)$$

Using equations (52) and (54) in equation (55b), results in:

$$E[|A_n|^4] = \frac{4}{45}(4m^2 - 1)(28m^2 - 13) \quad (56)$$

The above results can now be used to get closed-form expressions for the constants R used in the various blind equalization algorithms. The following (remarkably simple) expressions for these constants result:

$$R_{rca} \frac{E[a_n^2]}{E[|a_n|]} = \frac{4m^2 - 1}{3m}, \quad (57)$$

$$R_{mma}^2 \frac{E[a_n^4]}{E[a_n^2]} = \frac{12m^2 - 7}{5}, \text{ and} \quad (58)$$

$$R_{mma}^2 \frac{E[|A_n|^4]}{E[|A_n|^2]} = \frac{56m^2 - 26}{15}. \quad (59)$$

With respect to nonsquare signal constellations, the various symbol levels 2k-1 for $a_n$ and $b_n$ have a different probability of occurrence, even when all the complex symbols $A_n$ are equiprobable. This should be apparent from the 128-point constellation illustrated by FIG. 15. In this case, the moments of the symbols have to be computed according to the general formula:

$$E[|a_n|^L] = P_1 \sum_{k=1}^{m_1} (2k-1)^L + \quad (60)$$

-continued
$$P_2 \sum_{m_1+1}^{m_2} (2k-1)^L + P_3 \sum_{m_2+1}^{m_3} (2k-1)^L + \ldots$$

where $P_i$ is the probability of occurrence of the symbol levels appearing in the corresponding summation. For typical 32-CAP and 128-CAP constellations the expression in (60) is restricted to two different probabilities $P_1$ and $P_2$.

Everything else being equal (i.e., symbol rate, shaping filters, etc.), it is possible to guarantee a constant average power at the output of a CAP transmitter if $E[a_n^2] = E[b_n^2]$ =constant, independently of the type of signal constellation that is used. Of course, different signal constellations will have to use different symbol values if the average power constraint has to be satisfied. Thus, in general, a signal constellation will use symbol values $\lambda(2k-1)$ where $\lambda$ is chosen in such a way that the average power constraint is satisfied. For simplicity, it is assumed that $E[a_n^2] = 1$. For square constellations, the value of $\lambda$ can then be determined from equation (52), to result in:

$$E[a_n^2] = \frac{1}{m} \sum_{k=1}^{m} [\lambda(2k-1)]^2 = \frac{\lambda^2(4m^2 - 1)}{3} = 1 \rightarrow \lambda^2 = \frac{3}{4m^2 - 1} \quad (61)$$

Using this expression of $\lambda$ in equations (57), (58), and (59), the following expressions for the normalized constants R result:

$$\bar{R}_{rca} = \lambda \frac{E[a_n^2]}{E[|a_n|]} = \frac{\sqrt{4m^2 - 1}}{m\sqrt{3}}, \quad (62)$$

$$\bar{R}_{mma}^2 = \lambda^2 \frac{E[a_n^4]}{E[a_n^2]} = \frac{3}{5} \frac{12m^2 - 7}{4m^2 - 1}, \text{ and} \quad (63)$$

$$\bar{R}_{cma}^2 = \lambda^2 \frac{E[|A_n|^4]}{E[|A_n|^2]} = \frac{1}{5} \frac{56m^2 - 26}{4m^2 - 1}. \quad (64)$$

Similar expressions can be obtained for nonsquare constellations in a similar fashion. When the number of points in the signal constellation becomes very large, the following asymptotic values for the normalized constants result:

$$m \rightarrow \infty \quad \bar{R}_{rca} \approx 1.155 \quad \bar{R}_{mma} \approx 1.342 \quad \bar{R}_{cma} \approx 1.673. \quad (65)$$

Summary of RCA, CMA, and MMA Algorithms

A general comparison of the RCA, CMA, and MMA techniques is shown in the table of FIG. 18. In addition, the table shown in FIG. 19 shows illustrative values, for signal constellations of different sizes, of the constants R, $R_1$, and $R_2$, which are used in the tap updating algorithms of the RCA, CMA, and MMA, blind equalization techniques described above. The data shown in FIG. 19 assumes that the symbols $a_n$ and $b_n$ take the discrete values $\pm 1, \pm 3, \pm 5, \pm 7, \ldots$. The closed-form expressions for these constants are derived as described above.

Generally speaking, the RCA algorithm has less reliable convergence than either the CMA or MMA algorithms. As between the CMA and MMA algorithms, these algorithms have both benefits and drawbacks. For example, the CMA algorithm provides reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

Transition Algorithms

In accordance with the inventive concept, we have realized a blind equalization technique that uses both the CMA and MMA algorithms to achieve complementary results. This approach provides the basis for a "transition algorithm" that yields more reliable blind convergence without creating diagonal solutions, and avoids the expense of a rotator.

CMA-MMA Transition Algorithm

Figure 21:
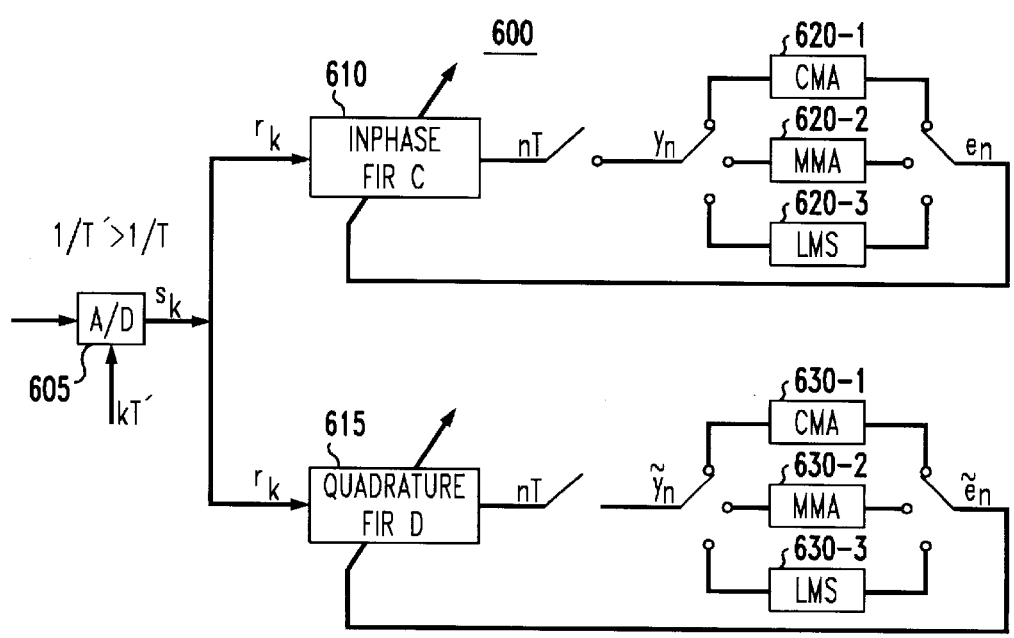
FIG. 21 shows an illustrative block diagram of a two-filter structure incorporating a CMA-MMA transition algorithm.
Figure 22:
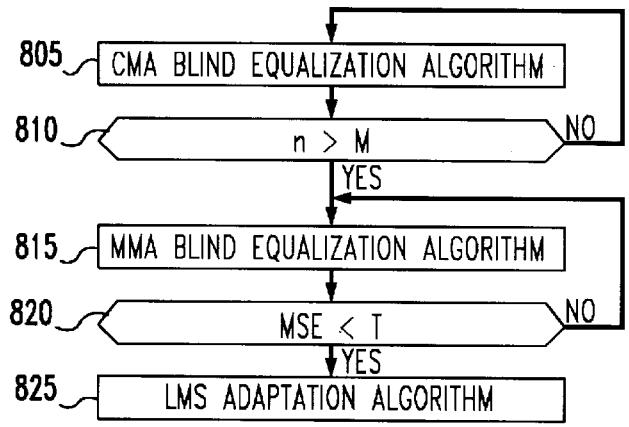
FIG. 22 shows an illustrative flow diagram for use in the structure of FIG. 21.

A first illustrative transition algorithm is called the "CMA-MMA transition algorithm." An illustrative two-filter structure is shown in FIG. 21 and a corresponding flow chart is shown in FIG. 22. A blind start-up procedure using a transition algorithm can be schedule-driven, event-driven, or both. With a schedule-driven approach, the switch between two different tap updating algorithms occurs after some fixed number, M, of iterations (which can be determined by a counter, for example). With an event-driven approach, the switch occurs when a certain quality of eye opening is achieved. This can be done, for example, by continuously monitoring the MSE and making the switch when the MSE is below some threshold T. FIG. 22 shows an example of a start-up procedure that uses both approaches. Values for M and T depend on the application and are determined experimentally. During start-up, the first blind equalization algorithm used is the CMA algorithm as shown in step 805. In this step, CMA elements 620-1 and 630-1, of FIG. 21, are used to converge the $tap_n$ coefficients of adaptive filters 610 and 615, respectively. As shown in step 810, the CMA algorithm is used until the number of iterations, n, is greater than M. Once this condition is reached, the transition algorithm switches to using the MMA algorithm in step 815. In this step, MMA elements 620-2 and 620-3, of FIG. 21 are used to converge the tap coefficients of adaptive filters 610 and 615, respectively. Finally, when the eye opens even more, e.g., to an MSE less than or equal to T, the receiver switches to a decision directed tap adaptation algorithm as shown in steps 820 and 825. In this step, LMS elements 620-3 and 630-3 are used to further adapt the tap coefficients of adaptive filters 610 and 615, respectively. (Illustrative values of M and T, based on a computer simulation of a 64-CAP constellation, are M=25,000 and T=−12 dB.) Thus, in the CMA-MMA transition algorithm, the receiver simply switches from CMA to MMA during blind start-up.

From equation (29), the cost finction for the CMA algorithm is given by:

$$CF = E[(|Y_n|^2 - R_c^2)^2], \quad (66)$$

where L=2.

The CMA tap updating algorithms, from equations (32a) and (32b) are:

$$c_{n+1} = c_n - \alpha(y_n^2 + \tilde{y}_n^2 - R_c^2)y_n r_n, \text{ and} \quad (67a)$$

$$d_{n+1} = d_n - \alpha(y_n^2 + \tilde{y}_n^2 - R_c^2)\tilde{y}_n r_n. \quad (67b)$$

where α is the step size, and $$R_c^2 = \frac{E[|A_n|^4]}{E[|A_n|^2]}.$$

From equation (36), the cost function for the MMA algorithm is:

$$CF = E[(y_n^2 - R_m^2)^2 + (\tilde{y}_n^2 R_m^2)^2], \quad (68)$$

where $$R_m^2 = \frac{E[a_n^4]}{E[a_n^2]}.$$

The MMA tap updating algorithms, from equations (40a) and (40b) are:

$$c_{n+1} = c_n - \alpha(y_n^2 - R_m^2)y_n r_n, \text{ and} \quad (69a)$$

$$d_{n+1} = d_n - \alpha(\tilde{y}_n^2 - R_m^2)\tilde{y}_n r_n. \quad (69b)$$

Unfortunately, computer simulations have indicated that a simple switch from the CMA algorithm to the MMA algorithm does not provide a smooth rotation of the constellation. As a result, additional examples of transition algorithms are described below.

Constant Rotation CMA (CR-CMA) Transition Algorithm

An analysis of the CMA algorithm shows that rotated constellations are generated because only magnitude information of the complex symbols $Y_n$ is used during convergence. With CMA, the cost finction minimizes the errors as follows:

$$CF = \frac{1}{2}[(|Y_n|^2 - R^2)^2] = E[(y_n^2 + \tilde{y}_n^2 - R^2)^2] \quad (70)$$

This cost function minimizes the dispersion of the magnitude $Y_n^2 = y_n^2 + \tilde{y}_n^2$ of the complex output samples of the equalizer around a circle, and does not take advantage of the phase information of $Y_n$. In accordance with the inventive concept, the CMA algorithm is modified by adding a weighting factor β to the complex symbol $Y_n$. In the in-phase dimension, $y_n^2$ becomes:

$$y_n^2 + \beta \tilde{y}_n^2 = y'_n{}^2 \quad (71)$$

and in the quadrature phase dimension, $\tilde{y}_n^2$ changes to:

$$\beta y_n^2 + \tilde{y}_n^2 = \tilde{y}'_n{}^2 \quad (72)$$

Note that $y'_n{}^2 = y_n^2 + \beta \tilde{y}_n^2$, which has phase information, is not invariant to a rotation. The proposed algorithm is called the Constant Rotation CMA (CR-CMA) transition algorithm. The cost finctions of CR-CMA are:

$$CF_I = E[(y_n^2 + \beta \tilde{y}_n^2 - R_r^2)^2], \text{ and} \quad (73a)$$

$$CF_Q = E[(\beta y_n^2 + \tilde{y}_n^2 - R_r^2)^2]. \quad (73b)$$

By using the weighting factor β, the equalizer has convergence properties which are intermediate between CMA and MMA.

Figure 23:
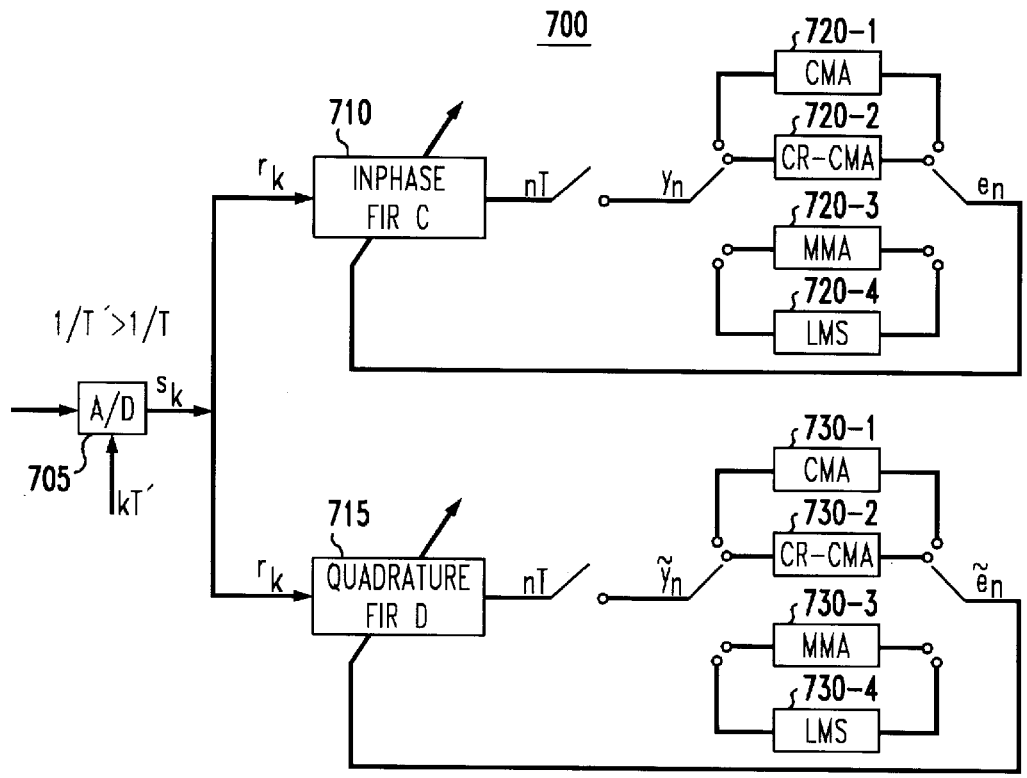
FIG. 23 shows an illustrative block diagram of a two-filter structure incorporating a CR-CMA transition algorithm.
Figure 24:
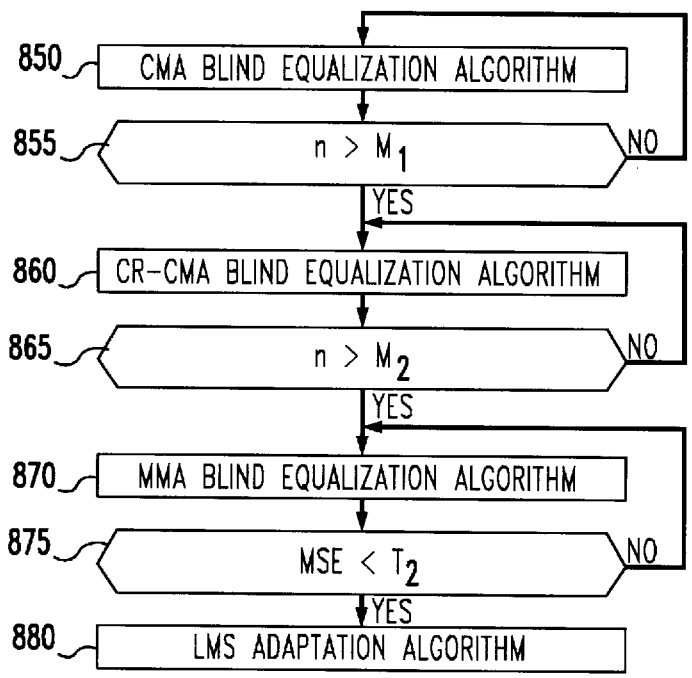
FIG. 24 shows an illustrative flow diagram for use in the structure of FIG. 23.

An illustrative two-filter structure is shown in FIG. 23 and a corresponding flow chart is shown in FIG. 24 for the CR-CMA transition algorithm. During start-up, the first blind equalization algorithm used is the CMA algorithm as shown in step 850. In this step, CMA elements 720-1 and 730-1, of FIG. 23, are used to converge the tap coefficients of adaptive filters 710 and 715, respectively. As shown in step 855, the CMA algorithm is used until the number of iterations, n, is greater than $M_1$. Once this condition is reached, the transition algorithm switches to using the CR-CMA algorithm in step 860 and n is reset to zero. In this step, CR-CMA elements 720-2 and 730-2, of FIG. 23 are used to converge the tap coefficients of adaptive filters 710 and 715, respectively. As the eye continues to open, the receiver switches to using the MMA algorithm when n is greater than $M_2$. This is indicated by steps 865 and 870. When the MMA algorithm is in use, elements 720-3 and 730-3, of FIG. 23 are used to converge the tap coefficients of adaptive filters 710 and 715, respectively. Finally, when the eye opens even more, e.g., to an MSE less than or equal to $T_2$, the receiver switches to a decision directed tap adaptation algorithm as shown in steps 875 and 880. At this point, LMS elements 720-4 and 730-4 are used to further adapt the tap coefficients of adaptive filters 710 and 715, respectively. (Illustrative values of $M_1$, $M_2$, and $T_2$, based on a computer simulation of a 64-CAP constellation, are $M_1=25{,}000$, $M_2=24{,}000$ and $T_2=-12$ dB).

As such, in this approach, the equalizer achieves blind convergence by using three blind algorithms, which are CMA, CR-CMA and MMA. The value of $\beta$ satisfies $0<\beta<1$. Illustratively, $\beta=0.5$. In this case, the effect of $\tilde{y}_n$ on $y_n$ is reduced by one half.

As noted above, the cost finctions of CR-CMA are:

$$CF_1 = E[(y_n^2 + \beta \tilde{y}_n^2 - R_r^2)^2] \tag{74a}$$

$$CR_Q = E[(\beta y_n^2 + \tilde{y}_n^2 - R_r^2)^2] \tag{74b}$$

where $\beta$ is a scaling factor, which satisfies $0 \leq \beta \leq 1$. Constellation rotation is obtained with nonzero $\beta$. When $\beta=1$, the cost fluction in equation (74a) becomes the same as that of CMA. When $\beta=0$, the sum of the two cost functions in equations (74a) and (74b) result in the cost function of MMA. The gradients of the two cost functions are derived as follows:

$$\nabla_c(CF_1) = E[(y_n^2 + \beta \tilde{y}_n^2 - R_r^2) y_n r_n] \; \nabla_d(CF_Q) = E[(\beta y_n^2 + \tilde{y}_n^2 - R_r^2) \tilde{y}_n r_n] \tag{75}$$

The constant $R_r$ is computed as:

$$R_r^2 = \frac{E[|A'_n|^4]}{E[|A'_n|^2]} \tag{76}$$

$$= \frac{E[(a_n^2 + \beta b_n^2)^2]}{E[a_n^2 + \beta b_n^2]} \tag{77}$$

$$= \frac{(1+\beta^2)E[a_n^4] + 2\beta E^2[a_n^2]}{(1+\beta)E[a_n^2]} \tag{78}$$

When $\beta=1$, $R=R_c$ and when $\beta=0$, $R=R_m$. The results are consistent with those obtained for the cost functions in equations (74a) and (74b). The tap coefficients of the filter are updated in the opposite direction of the gradients. So that the tap updating algorithms are:

$$c_{n+1} = c_n \mu (y_n^2 + \beta \tilde{y}_n^2 - R_r^2) y_n r_n \tag{79}$$

$$d_{n+1} = d_n \mu (\beta y_n^2 + \tilde{y}_n^2 - R_r^2) \tilde{y}_n r_n \tag{80}$$

Because of the use of the constant factor $\beta$, a transition from CMA to MMA that keeps the eye open during the rotation cannot be done with CR-CMA. Normally, MMA is required to achieve final blind convergence as described above.

Dynamic Rotation CMA (DR-CMA) Transition Algorithm

In the above-described CR-CMA transition algorithm, the constellation gradually converges to its final position. However, the eye does not remain open during the rotation. Therefore, in order to keep the eye open during the rotation, a Dynamic Rotation CMA (DR-CMA) Transition Algorithm is presented. In this approach, a time-varying $\beta$ is used in equation (73). To reduce the mutual effects between the two dimensions, a declining error factor $|e_{r,n}|$ is introduced as a weighting factor into the cost function of CMA. Thus, equation (73) becomes:

$$CF_1 = E[(y_n^2 + \beta|e_{r,n}|\tilde{y}_n^2 - (R_m^2 + \beta|e_{r,n}|(R_c^2 - R_m^2)))^2] \tag{81a}$$

$$CF_Q = E[(\tilde{y}_n^2 + \beta|\tilde{e}_{r,n}|y_n^2 - (R_m^2 + \beta|\tilde{e}_{r,n}|(R_c^2 - R_m^2)))^2] \tag{81b}$$

where $R_c$ refers to the constant of CMA and $R_m$ refers to the constant of MMA. Note that the time-varying factor has two functions. In the case of the in-phase dimension, $e_{r,n}$ is used to reduce gradually the effect of $\tilde{y}_n$. In addition, it should be noted that the constants R are different for CMA and MMA. Normally, $R_c > R_m$, so that $|e_{r,n}|$ is also used to make the change from $R_c$ to $R_m$ dynamically. When the error $|e_{r,n}|$ goes to zero, the contributions of the two quantities $\tilde{y}_n$ and $(R_c^2 - R_m^2)$ converge to zero as well. Eventually, with a perfect convergence, the cost function of CMA converges to the one of MMA. Thus, a smooth transition from CMA to MMA that keeps the eye open can be done during filter adaptation without using a rotator. Note that $\beta$ in equation (81) functions as a step size to control the scale of the time-varying weighting factor. A smooth equalizer rotation can be obtained when the step size $\beta$ is properly chosen.

Figure 25:
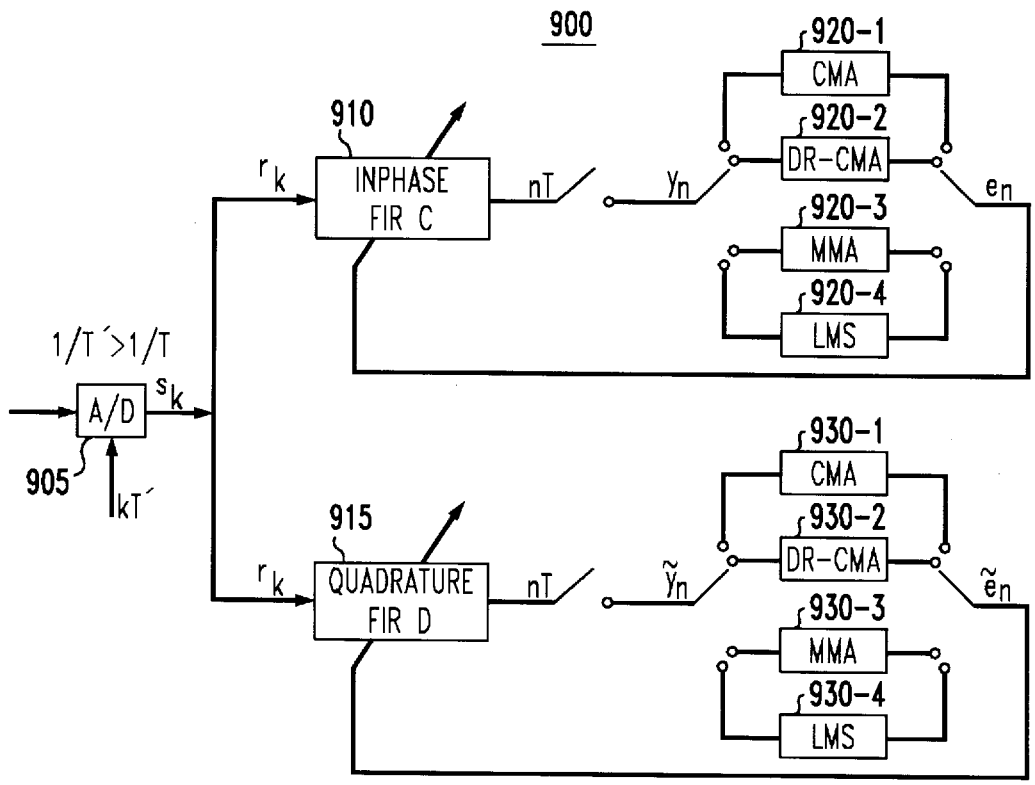
FIG. 25 shows an illustrative block diagram of a two-filter structure incorporating a DR-CMA transition algorithm.
Figure 26:
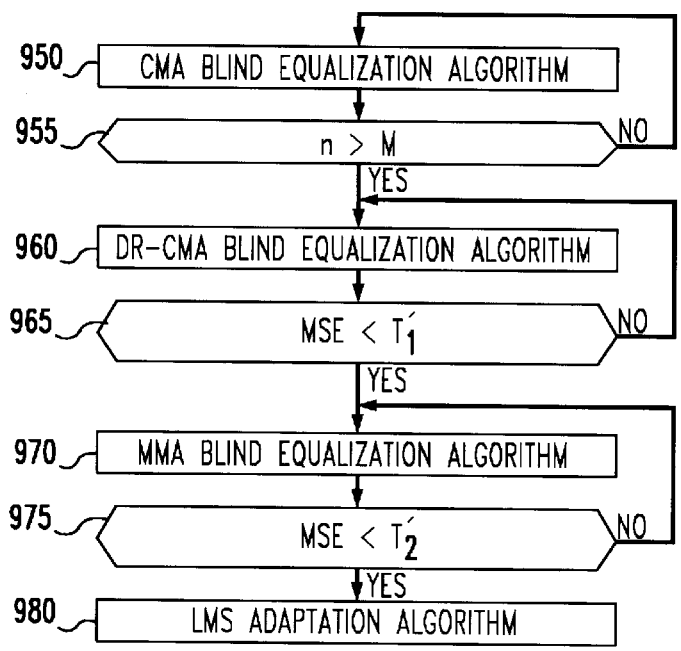
FIG. 26 shows an illustrative flow diagram for use in the structure of FIG. 25.

An illustrative two-filter structure is shown in FIG. 25 and a corresponding flow chart is shown in FIG. 26 for the DR-CMA transition algorithm. During start-up, the first blind equalization algorithm used is the CMA algorithm as shown in step 950. In this step, CMA elements 920-1 and 930-1, of FIG. 25, are used to converge the tap coefficients of adaptive filters 910 and 915, respectively. As shown in step 955, the CMA algorithm is used until the number of iterations, n, is greater than M. Once this condition is reached, the transition algorithm switches to using the DR-CMA algorithm in step 960. In this step, DR-CMA elements 920-2 and 930-2, of FIG. 25 are used to converge the tap coefficients of adaptive filters 910 and 915, respectively. As the eye continues to open, the receiver switches to using the MMA algorithm when an MSE less than or equal to $T_1$ is reached. This is indicated by steps 965 and 970. When the MMA algorithm is in use, elements 920-3 and 930-3, of FIG. 25 are used to converge the tap coefficients of adaptive filters 910 and 915, respectively. Finally, when the eye opens even more, e.g., to an MSE less than or equal to $T_2'$ (where $T_2' < T_1'$), the receiver switches to a decision directed tap adaptation algorithm as shown in steps 975 and 980. At this point, LMS elements 920-4 and 930-4 are used to further adapt the tap coefficients of adaptive filters 910 and 915, respectively. Illustrative values of $M_1$, $M_2$ and $T_2$, based on a computer simulation of a 64-CAP constellation, are $M=25{,}000$, $T_1'=-10$ dB, and $T_2'=-12$ dB.

As with the CR-CMA algorithm, the cost functions for DR-CMA are written separately for the in-phase and quadrature phase dimensions:

$$CF_1 = E[(y_n^2 + \beta|e_{r,n}|\tilde{y}_n^2 - (R_m^2 + \beta|e_{r,n}|(R_c^2 - R_m^2)))^2] \tag{82}$$

$$CF_Q = E[(\tilde{y}_n^2 + \beta|\tilde{e}_{r,n}|y_n^2 - (R_m^2 + \beta|\tilde{e}_{r,n}|(R_c^2 - R_m^2)))^2] \tag{83}$$

In the case of the in-phase dimension, when $|\beta e_{r,n}|=1$, the cost finction $CF_1$ is equivalent to the one used for CMA, and for $|\beta e_{r,n}|=0$, the cost function $CF_1$ reduces to the one used for MMA. Note that the transition cost function between CMA to MMA is dynamic because of the factor $|e_{r,n}|$. The gradients of the cost functions are derived as:

$$\nabla_c(CF) = E[(y_n^2 + \beta|e_{r,n}|\tilde{y}_n^2 - (R_m^2 \beta|e_{r,n}|(R_c^2 - R_m^2))) y_n r_n] \tag{84}$$

$$\nabla_d(CF) = E[(\tilde{y}_n^2 + \beta|\tilde{e}_{r,n}|y_n^2 - (R_m^2 + \beta|\tilde{e}_{r,n}|(R_c^2 - R_m^2))) \tilde{y}_n r_n] \tag{85}$$

The time-varying weighting factor is treated as a constant when deriving the algorithms for tap updating. Tap updating is done in the opposite direction of the gradients, so that:

$$c_{n+1}=c_n-\mu[y_n^2+\beta|e_{r,n}|\tilde{y}_n^2-(R_m^2+\beta|e_{r,n}|(R_c^2-R_m^2)]\tilde{y}_n r_n \qquad (86)$$

$$d_{n+1}=d_n-\mu[\tilde{y}^2+\beta|\tilde{e}_{r,n}|y_n^2-(R_m^2+\beta|\tilde{e}_{r,n}|(R_c^2-R_m^2)]\tilde{y}_n r_n \qquad (87)$$

With dynamic adaptation, in the case of in-phase dimension, the tap updating starts in the CMA mode with $|\beta e_{r,n}|=1$, and it is smoothly transferred to the MMA mode with gradually reduced $|\beta e_{r,n}|$. A complete transition from CMA to MMA can be obtained when $|\beta e_{r,n}|=0$ and $|\beta \tilde{e}_{r,n}|=0$.

Figure 27:
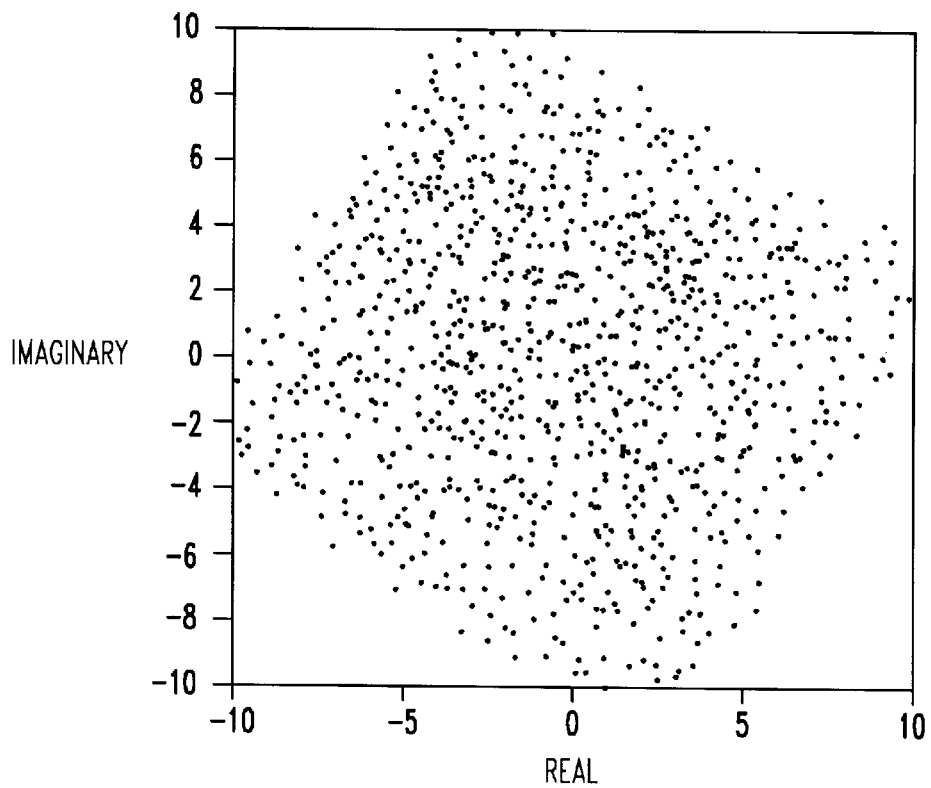
FIGS. 27 and 28 show illustrative signal point constellations recovered using the CR-CMA and DR-CMA approaches, respectively.
Figure 28:
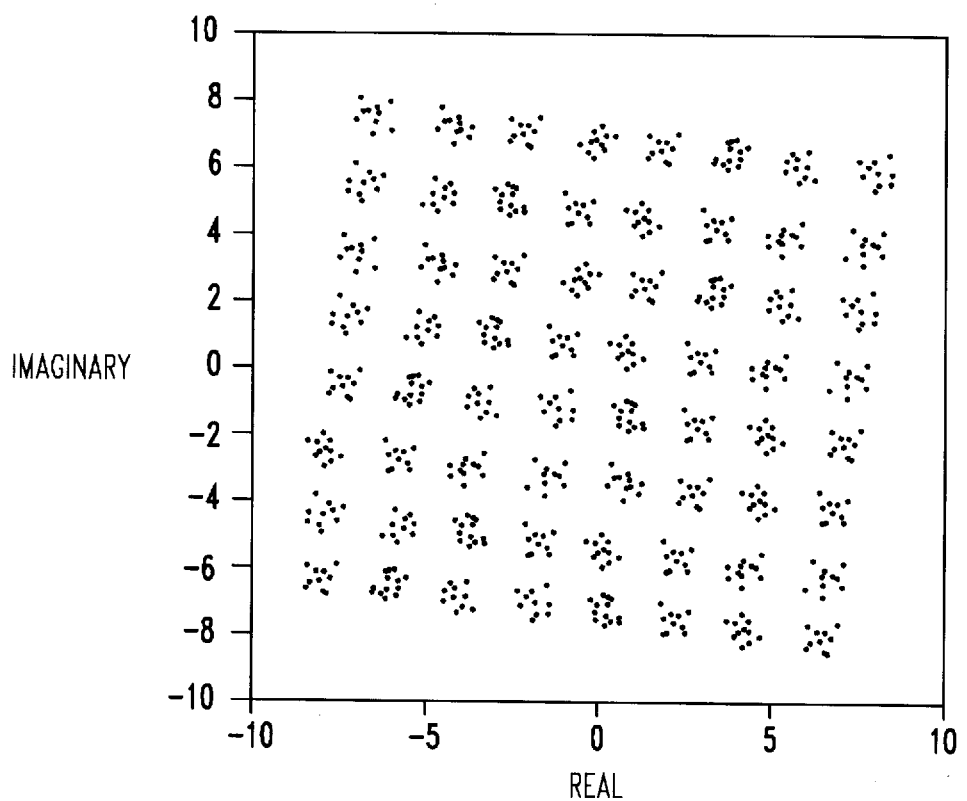

FIGS. 27–28 show illustrative signal constellations for comparison purposes only. FIG. 27 illustrates a signal constellation obtained by using CR-DMA. FIG. 28 illustrates a signal constellation obtained by using DR-CMA. Obviously, a smoother rotation can be achieved with DR-CMA than with CR-CMA. It should be noted that experiments show that for some applications, complete blind equalization can be achieved by using DR-CMA with a carefully chosen β so that the MMA algorithm need not be used, and the equalizer can directly switch to the LMS algorithm to achieve steady-state equalization thus bypassing steps 970 and 975 of FIG. 26. In comparison to CR-CMA, DR-CMA is more complicated to implement. However, better convergence performance can be achieved with DR-CMA than with CR-CMA in most cases.

Figure 11:
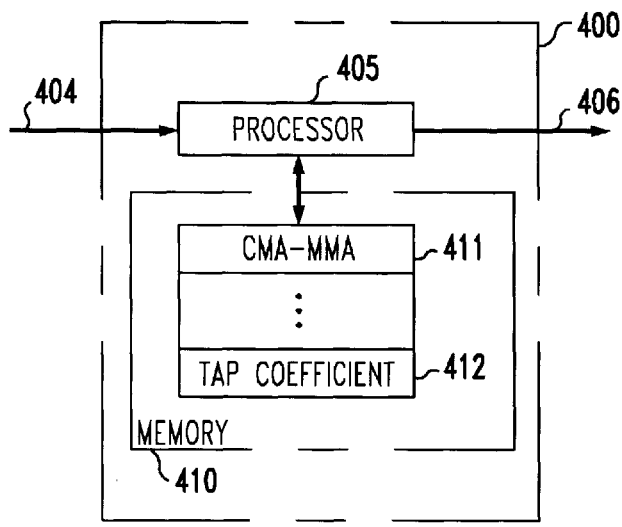
FIGS. 11 and 12 are illustrative block diagrams of a portion of a receiver embodying the principles of the invention.
Figure 12:
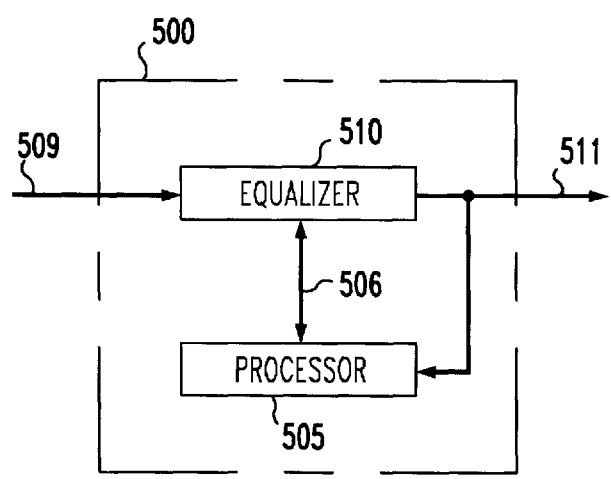

Illustrative embodiments of the inventive concept are shown in FIGS. 11 and 12. FIG. 11 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the combined CMA-MMA type algorithms. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide a output signal 406. For the purposes of example only, it is assumed that output signal 406 represents a sequence of output samples of an equalizer. (As known in the art, a digital signal processor may, additionally, further process received signal 404 before deriving output signal 406.) An illustrative software program is not described herein since, after learning of the combined CMA-MMA type algorithms as described herein, such a program is within the capability of one skilled in the art. Also, it should be noted that any equalizer structures, such as those described earlier, can be implemented by digital signal processor 400 in accordance with the inventive concept.

FIG. 12 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 11 for implementing the combined CMA-MMA type algorithms. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an equalizer, etc., the functions of any one or more of those building blocks can be carried out using one or more appropriate programmed processors.

In addition, although the inventive concept was described in the context of an FSLE, the inventive concept is applicable to other forms of adaptive filters, such as, but not limited to, a decision feedback equalizer (DFE). The inventive concept is applicable to all forms of communications systems, e.g., broadcast networks, e.g., high-definition television (HDTV), point-to-multipoint networks like fiber to the curb (mentioned above), signal identification or classification applications, like wire-tapping, etc.

What is claimed:

1. An improved method for performing blind equalization in a receiver, the improvement comprising:
   using a transition algorithm to perform the blind equalization.

2. The method of claim 1 wherein the using step includes the steps of:
   using a constant modulus algorithm (CMA) to initially adapt a set of coefficient values of an adaptive filter; and
   using a multimodulus algorithm (MMA) to finally adapt the set of coefficient values of the adaptive filter.

3. The method of claim 2 wherein the CMA algorithm initially adapts the set of coefficients of the adaptive filter until a calculated error rate of a received signal is less than or equal to a predetermined value, at which point the MMA algorithm is used to finally adapt the set of coefficient values of the adaptive filter.

4. The method of claim 2 wherein the CMA algorithm initially adapts the set of coefficients of the adaptive filter until a predetermined number of iterations is reached, at which point the MMA algorithm is used to finally adapt the set of coefficient values of the adaptive filter.

5. The method of claim 1 wherein the using step includes the step of:
   sequentially using each one of a plurality of different convergence algorithms to blindly converge an adaptive filter of the receiver.

6. The method of claim 5 wherein the plurality of different convergence algorithms include a constant modulus algorithm and a multimodulus algorithm.

7. The method of claim 1 wherein the using step includes the steps of:
   using a constant modulus algorithm (CMA) to initially adapt a set of coefficient values of an adaptive filter;
   changing to a Constant Rotation CMA-MMA algorithm to continue to adapt the set of coefficient values of the adaptive filter; and
   changing to a multimodulus algorithm (MMA) to finally adapt the set of coefficient values of the adaptive filter.

8. The method of claim 7 wherein the transition from the CMA algorithm occurs when a number of iterations is greater than a predetermined number.

9. The method of claim 1 wherein the using step includes the steps of:
- using a constant modulus algorithm (CMA) to initially adapt a set of coefficient values of an adaptive filter;
- changing to a Dynamic Rotation CMA-MMA algorithm to continue to adapt the set of coefficient values of the adaptive filter; and
- changing to a multimodulus algorithm (MMA) to finally adapt the set of coefficient values of the adaptive filter.

10. The method of claim 9 wherein the transition from the CMA-MMA algorithm occurs when a calculated mean-squared-error is less than a predetermined value.

11. The method of claim 1 further comprising the step of switching to a decision directed adaptation algorithm, after the blind equalization converges, for adjusting the set of tap coefficient values when a calculated error rate is less than a predetermined value.

12. The method of claim 11 wherein the decision directed adaptation algorithm uses a least means squared tap updating algorithm.

13. A method for use in a communications receiver, the method comprising the steps of:
- using an adaptive filter structure for processing a received signal, the adaptive filter structure including a corresponding set of tap coefficient values; and
- using at least two different convergence algorithms for blindly converging the set of tap coefficient values.

14. The method of claim 13 wherein the using at least two different convergence algorithms step includes the steps of:
- using a constant modulus algorithm (CMA) to initially adapt the set of coefficient values of the adaptive filter; and
- using a multimodulus algorithm (MMA) to finally adapt the set of coefficient values of the adaptive filter.

15. The method of claim 14 wherein the CMA algorithm initially adapts the set of coefficients of the adaptive filter until a calculated error rate of the received signal is less than or equal to a predetermined value, at which point the MMA algorithm is used to finally adapt the set of coefficient values of the adaptive filter.

16. The method of claim 14 wherein the CMA algorithm initially adapts the set of coefficients of the adaptive filter until a predetermined number of iterations is reached, at which point the MMA algorithm is used to finally adapt the set of coefficient values of the adaptive filter.

17. The method of claim 13 wherein the using step includes the steps of:
- using a constant modulus algorithm (CMA) to initially adapt the set of coefficient values of the adaptive filter;
- changing to a Constant Rotation CMA-MMA algorithm to continue to adapt the set of coefficient values of the adaptive filter; and
- changing to a multimodulus algorithm (MMA) to finally adapt the set of coefficient values of the adaptive filter.

18. The method of claim 17 wherein the transition from the CMA algorithm occurs when a number of iterations is greater than a predetermined number.

19. The method of claim 13 wherein the using step includes the steps of:
- using a constant modulus algorithm (CMA) to initially adapt the set of coefficient values of the adaptive filter;
- changing to a Dynamic Rotation CMA-MMA algorithm to continue to adapt the set of coefficient values of the adaptive filter; and
- changing to a multimodulus algorithm (MMA) to finally adapt the set of coefficient values of the adaptive filter.

20. The method of claim 19 wherein the transition from the CMA-MMA algorithm occurs when a calculated mean-squared-error is less than a predetermined value.

21. The method of claim 13 further comprising the step of switching to a decision directed adaptation algorithm, after the blind equalization converges, for adjusting the set of tap coefficient values when a calculated error rate is less than a predetermined value.

22. The method of claim 21 wherein the decision directed adaptation algorithm uses a least means squared tap updating algorithm.

23. An improved equalizer for use in a receiver for performing blind equalization; the improvement comprising:
- a processor that adapts coefficients of the equalizer by using at least two different blind equalization algorithms.

24. The apparatus of claim 23 wherein the processor is a digital signal processor.

25. The apparatus of claim 23 wherein the at least two different blind equalization algorithms are a constant modulus algorithm (CMA) and a multimodulus algorithm (MMA).

26. The apparatus of claim 25 wherein the CMA algorithm is used to initially adapt the set of coefficients of the equalizer until a calculated error rate of the received signal is less than or equal to a predetermined value, at which point the MMA algorithm is used to finally adapt the set of coefficient values of the equalizer.

27. The apparatus of claim 25 wherein the CMA algorithm is used to initially adapt the set of coefficients of the equalizer until a predetermined number of iterations is reached, at which point the MMA algorithm is used to finally adapt the set of coefficient values of the equalizer.

28. An improved equalizer for use in a receiver for performing blind equalization; the improvement comprising:
- a processor a) for providing an equalizer finction for equalizing a received signal, and b) for adapting coefficients of the equalizer function by using at least two different blind equalization algorithms.

29. The apparatus of claim 28 wherein the processor is a digital signal processor.

30. The apparatus of claim 28 wherein the at least two different blind equalization algorithms are a constant modulus algorithm (CMA) and a multimodulus algorithm (MMA).

31. The apparatus of claim 30 wherein the CMA algorithm is used to initially adapt the set of coefficients of the equalizer until a calculated error rate of the received signal is less than or equal to a predetermined value, at which point the MMA algorithm is used to finally adapt the set of coefficient values of the equalizer.

32. The apparatus of claim 30 wherein the CMA algorithm is used to initially adapt the set of coefficients of the equalizer until a predetermined number of iterations is reached, at which point the MMA algorithm is used to fmally adapt the set of coefficient values of the equalizer.

33. Apparatus for use in performing blind equalization in a receiver, the apparatus comprising:
- a memory for storing a transition algorithm for performing blind equalization and for storing a set of tap coefficient values; and
- a processor a) for filtering an input signal as a function of the set of stored tap coefficient values to provide an output signal, and b) for executing the transition algorithm to blindly adapt the set of stored tap coefficient values.

34. The apparatus of claim 33 wherein the transition algorithm comprises at least two different blind equalization algorithms.

35. The apparatus of claim 34 wherein the at least two different blind equalization algorithms are a constant modulus algorithm (CMA) and a multimodulus algorithm (MMA).

36. The apparatus of claim 35 wherein the CMA algorithm is used to initially adapt the set of coefficients of the equalizer until a calculated error rate of the received signal is less than or equal to a predetermined value, at which point the MMA algorithm is used to finally adapt the set of coefficient values of the equalizer.

37. The apparatus of claim 35 wherein the CMA algorithm is used to initially adapt the set of coefficients of the equalizer and the MMA algorithm is used to finally adapt the set of coefficient values of the equalizer.

38. Apparatus for use in a receiver, the apparatus comprising:

an equalizer having a set of tap coefficient values and for providing an equalized version of an applied input signal; and a processor for blindly adapting the set of tap coefficients as a function of a transition algorithm.

39. The apparatus of claim 38 wherein the transition algorithm comprises at least two different blind equalization algorithms.

40. The apparatus of claim 39 wherein the at least two different blind equalization algorithms are a constant modulus algorithm (CMA) and a multimodulus algorithm (MMA).

41. The apparatus of claim 40 wherein the CMA algorithm is used to initially adapt the set of coefficients of the equalizer until a calculated error rate of the received signal is less than or equal to a predetermined value, at which point the MMA algorithm is used to finally adapt the set of coefficient values of the equalizer.

42. The apparatus of claim 40 wherein the CMA algorithm is used to initially adapt the set of coefficients of the equalizer and the MMA algorithm is used to finally adapt the set of coefficient values of the equalizer.

* * * * *